United States Patent
Mao et al.

(10) Patent No.: US 8,348,760 B2
(45) Date of Patent: Jan. 8, 2013

(54) SYSTEMS AND METHODS FOR DETERMINING CONTROLLER FUNCTIONALITY BASED ON POSITION, ORIENTATION OR MOTION

(75) Inventors: Xiaodong Mao, Foster City, CA (US); Noam Rimon, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 105 days.

(21) Appl. No.: 12/953,375

(22) Filed: Nov. 23, 2010

(65) Prior Publication Data

US 2011/0195782 A1 Aug. 11, 2011

Related U.S. Application Data

(60) Provisional application No. 61/302,071, filed on Feb. 5, 2010.

(51) Int. Cl.
*G06F 17/00* (2006.01)
*G06F 3/033* (2006.01)

(52) U.S. Cl. .......................................... 463/37; 345/158
(58) Field of Classification Search .............. 463/35–39; 345/156–158
See application file for complete search history.

(56) References Cited

U.S. PATENT DOCUMENTS

| | | | | |
|---|---|---|---|---|
| 7,348,963 B2* | 3/2008 | Bell | | 345/156 |
| 7,627,139 B2* | 12/2009 | Marks et al. | | 382/103 |
| 7,698,096 B2* | 4/2010 | Ohta | | 702/151 |
| 8,019,121 B2* | 9/2011 | Marks et al. | | 382/103 |
| 2007/0060383 A1* | 3/2007 | Dohta | | 463/43 |
| 2007/0222750 A1 | 9/2007 | Ohta | | 345/158 |
| 2008/0001951 A1* | 1/2008 | Marks et al. | | 345/474 |
| 2008/0244466 A1 | 10/2008 | Orsley | | 715/863 |
| 2009/0203445 A1* | 8/2009 | Dohta et al. | | 463/39 |
| 2009/0262075 A1 | 10/2009 | Kimmel et al. | | 345/163 |
| 2011/0294574 A1* | 12/2011 | Yamada et al. | | 463/30 |

FOREIGN PATENT DOCUMENTS

EP 1764140 3/2007
WO WO 2009/126772 A1 10/2009

OTHER PUBLICATIONS

International Preliminary Report on Patentability (IPRP) issued in International Application No. PCT/US2010/057519, and Notification Concerning Transmittal, mailed on May 31, 2012 (9 pages).

* cited by examiner

*Primary Examiner* — Ronald Laneau
(74) *Attorney, Agent, or Firm* — Martine Penilla Group, LLP

(57) ABSTRACT

Methods and systems for providing input to an interactive program are presented. An interactive system includes a display for displaying an interactive program and a controller device. The position and motion of the controller device are determined based on perspective distortion of the display in captured images of the display taken at the controller. In an interactive region, various interactive zones are defined, each of which have an associated specified function for an action of the controller device. When the controller device is determined to be within one of the interactive zones, the functionality of the action of the controller device is set to the specified function associated with that interactive zone.

27 Claims, 25 Drawing Sheets

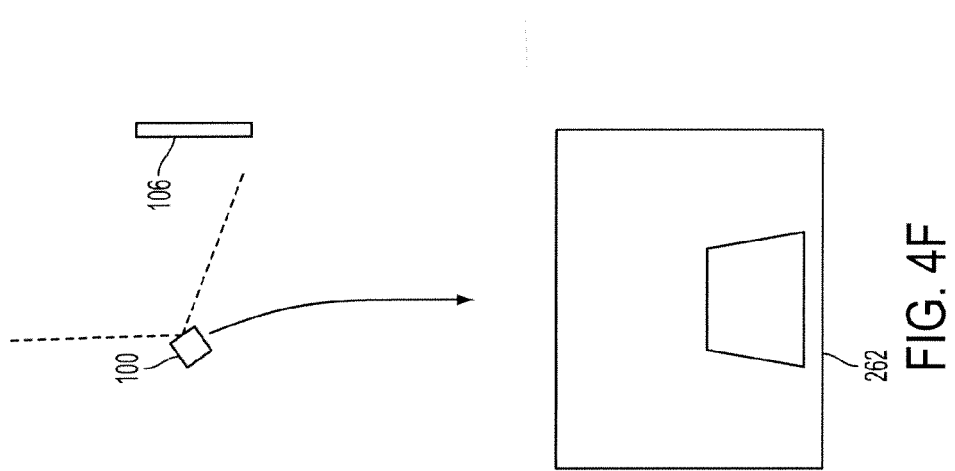
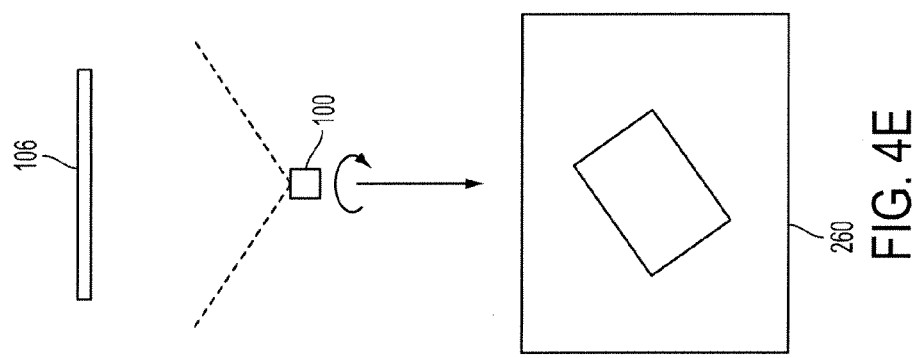
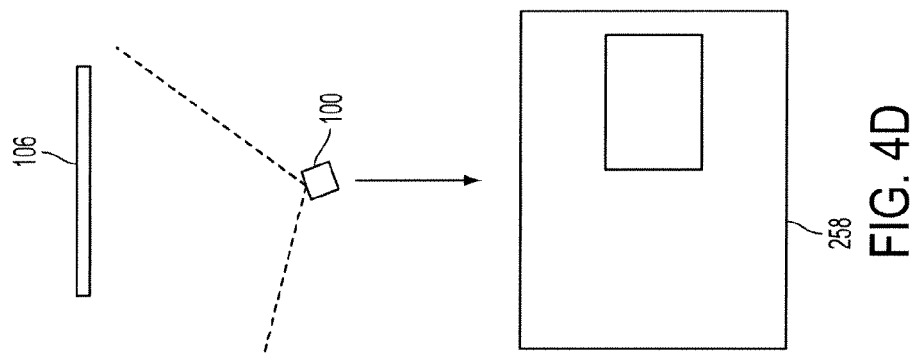

SYSTEMS AND METHODS FOR DETERMINING CONTROLLER FUNCTIONALITY BASED ON POSITION, ORIENTATION OR MOTION

CLAIM OF PRIORITY

This application claims priority to the U.S. Provisional Patent Application No. 61/302,071, entitled "SYSTEMS AND METHODS FOR DETERMINING CONTROLLER FUNCTIONALITY BASED ON POSITION, ORIENTATION OR MOTION", filed Feb. 5, 2010, by inventors Xiadong Mao, Gary Zalewski and Noam Rimon; which is incorporated herein by reference.

RELATED APPLICATIONS

This application is related to the U.S. patent application Ser. No. 12/623,352, entitled "CONTROLLER FOR INTERFACING WITH A COMPUTING PROGRAM USING POSITION, ORIENTATION, OR MOTION," filed Nov. 20, 2009, by inventors Xiadong Mao and Noam Rimon, the disclosure of which is herein incorporated by reference in its entirety.

BACKGROUND

1. Field of the Invention

The present invention relates to methods and systems for interfacing a control device with a computer device, and more particularly, methods and systems for interfacing a control device with a computer program executing at a base computing device.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

It is in this context that embodiments of the invention arise.

SUMMARY

Embodiments of the present invention provide methods and systems for determining, setting, adjusting, or otherwise affecting the functionality of a controller device based on its position, orientation, or motion. It should be appreciated that the present invention can be implemented in numerous ways, such as a process, an apparatus, a system, a device or a method on a computer readable medium. Several inventive embodiments of the present invention are described below.

In one embodiment, in a computer-based system having a display and a controller device for interfacing with an interactive program, a method for determining a functionality of an action of a controller device is provided. According to the method interactive zones are defined, each interactive zone being defined by a spatial region having an associated specified function for the action of the controller device when the controller device is located within that interactive zone. A position of the controller device is determined. And the functionality of the action of the controller device is set to have the specified function associated with the interactive zone within which the controller device is located.

In one embodiment, each spatial region defines a volume located on a front side of the display, the front side of the display being a side on which an image projected by the display may be viewed. In another embodiment, a total volume defined by the interactive zones defines an interactive region within which the position of the controller device may be determined.

In one embodiment, each specified function is operable for causing an action within the interactive program. In another embodiment, the specified functions associated with two or more of the interactive zones are similar functions which vary by degree. In another embodiment, the specified functions associated with two or more of the interactive zones are dissimilar functions.

In one embodiment, the action of the controller device is an input received from a user of the controller device and communicated from the controller device to the interactive program. In one embodiment, the input received from a user is entered via an input device of the controller device. In one embodiment, the input device is selected from a group consisting of a button, joystick, trigger, touchpad, trackball, or pressure sensor. In another embodiment, the input received from a user is entered via movement of the controller device.

In one embodiment, the determination of the position of the controller device includes method operations of capturing an image of the display at the controller device, and determining the position of the controller device based on perspective distortion of the display in the captured image of the display.

In one embodiment, a method for interfacing with an interactive program is provided. According to the method, a plurality of zones is defined, the plurality of zones being defined within an interactive region of space for which a location of a controller device may be determined The location of one or more controller devices is continuously detected. And, when a controller device is determined to be positioned within one of the plurality of zones, an action of the controller device that is communicated to the interactive program is set to have a function associated with that zone, the function being defined for causing an action within the interactive program.

In one embodiment, the plurality of zones are arranged in a non-overlapping and contiguous fashion so as to define a spatial matrix within the interactive region of space.

In one embodiment, a different subset of the plurality of zones is operative for determining the function of an action of each of the controller devices.

In one embodiment, each of the plurality of the zones has one or more associated functions which correspond to one or more of the controller devices.

In one embodiment, the method further includes the method operation of activating a zone indicator when the controller device is determined to be positioned within one of the plurality of zones. The zone indicator provides a notification of which of the plurality of zones in which the controller devices is located. In one embodiment, the zone indicator may consist of a light indicator, a sound, a visual indicator on a display, and/or vibration of the controller device.

In one embodiment, the detection of a transition of the controller device from a location within a zone to a location outside of the zone causes a signaling response to be activated. In various embodiments, the signaling response may consist of a sound, a light indicator, a warning on a display, and/or vibration of the controller device.

In one embodiment, functions associated with one or more of the zones are different types of sounds.

In one embodiment, the action communicated to the interactive program is a movement of the controller device, the movement of the controller device being defined by a change in location and/or orientation.

In one embodiment, the continuous detection of the location of the one or more controller devices includes method operations of capturing an image of a display at each controller device, and continuously determining the location of each controller device based on perspective distortion of the display in the captured image of the display.

In another embodiment, a system for interfacing with an interactive program is provided. The system includes a computing device for executing the interactive program, a display for displaying the interactive program, and a controller device for providing input to the interactive program. The controller device an image capture device for capturing images of the display. The position of the controller device is continuously determined based on a perspective distortion of the display in the captured images of the display.

Additionally, the computing device is configured to define interactive zones, each interactive zone being defined by a spatial region having an associated specified function for an action of the controller device when the controller device is located within that interactive zone. And the computing device is configured to set the functionality of the action of the controller device to the specified function associated with the interactive zone within which the controller device is located.

In one embodiment, each spatial region defines a volume located on a front side of the display, the front side of the display being a side on which an image projected by the display may be viewed.

In one embodiment, each specified function is operable for causing an action within the interactive program.

In one embodiment, the interactive zones are dynamically determined according to a state of the interactive program.

In another embodiment, a controller device for providing input to an interactive program is provided, wherein the interactive program being executed by a computing device and rendered on a display. The controller device includes image capture device for capturing images of a display, and a position determination module for continuously determining the position of the controller device based on perspective distortion of the display in the captured images of the display. A functionality setting module is provided for setting the functionality of an action of the controller device.

The controller device is configured to be operated within interactive zones, each interactive zone being defined by a spatial region having an associated specified function for the action of the controller device when the controller device is located within that interactive zone. The functionality setting module is configured to set the functionality of the action of the controller device to the specified function associated with the interactive zone within which the controller device is located.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 4A, 4B, 4C, 4D, 4E, and 4F illustrate views of a controller at various locations in relation to a display, in accordance with an embodiment of the invention.

FIG. 24B illustrates an embodiment where the attachment of

FIG. 24A is connected to the controller of FIG. 22.

DETAILED DESCRIPTION

The following embodiments describe methods and apparatus for interfacing a control device (controller) with a computer program executing at a base computing device by using visual cues for both user feedback and input to the computer program. In specific embodiments of the invention, the position, orientation, or motion of the controller is used to determine, set, adjust, or otherwise affect the functionality of the controller. As described in further detail below, the position and orientation of the controller may be determined by capturing images of a stationary display at the controller, and determining the perspective distortion and orientation of the display within the captured images.

It will be obvious, however, to one skilled in the art, that the present invention may be practiced without some or all of these specific details. In other instances, well known process operations have not been described in detail in order not to unnecessarily obscure the present invention.

Throughout this detailed description of various exemplary embodiments of the invention, reference will be made to analysis of images to determine objects or the properties of objects within the images. Such analysis may employ any of various image recognition methods and techniques as are known in the art, without departing from the spirit and scope of the invention.

Figure 1:
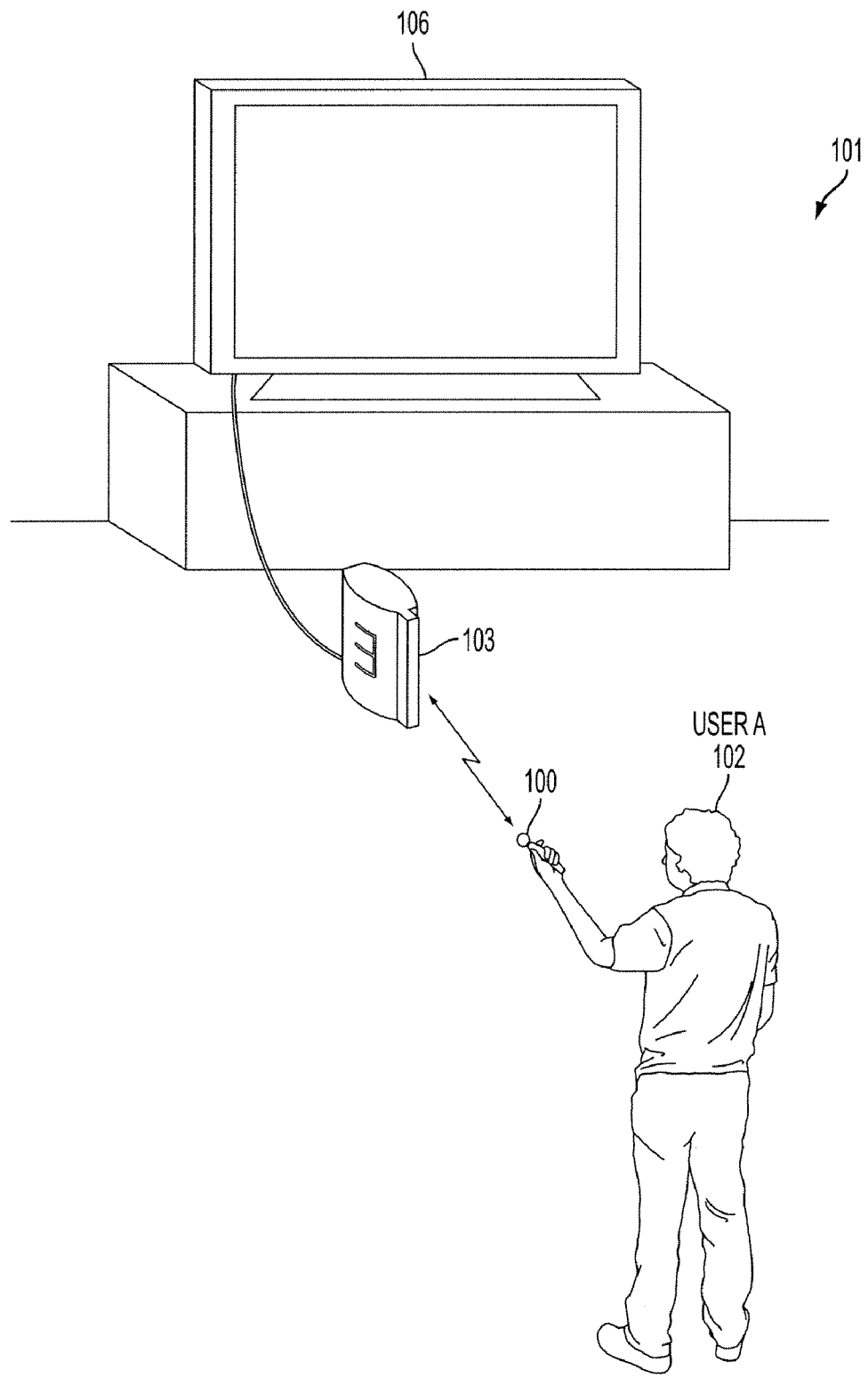
FIG. 1 illustrates a generic interactive system, in accordance with an embodiment of the invention.

FIG. 1 illustrates a generic interactive system 101. The system includes a computer 103 and a display 106. In various embodiments, the computer 103 may be a general purpose computer, a special purpose computer, a gaming console, or other such device which executes an interactive program that is rendered on the display 106. Examples of gaming consoles as are known in the art include those manufactured by Sony, Microsoft, Nintendo, and the like. The display 106 may be a television, a monitor, a projector display, or other such displays and display systems which are capable of receiving and rendering video output from the computer 103. A user 102 provides input to the interactive program by moving a controller 100. In a preferred embodiment, the controller 100 communicates wirelessly with the computer 103, as this provides for greater freedom of movement of the controller than a wired connection.

Figure 2:
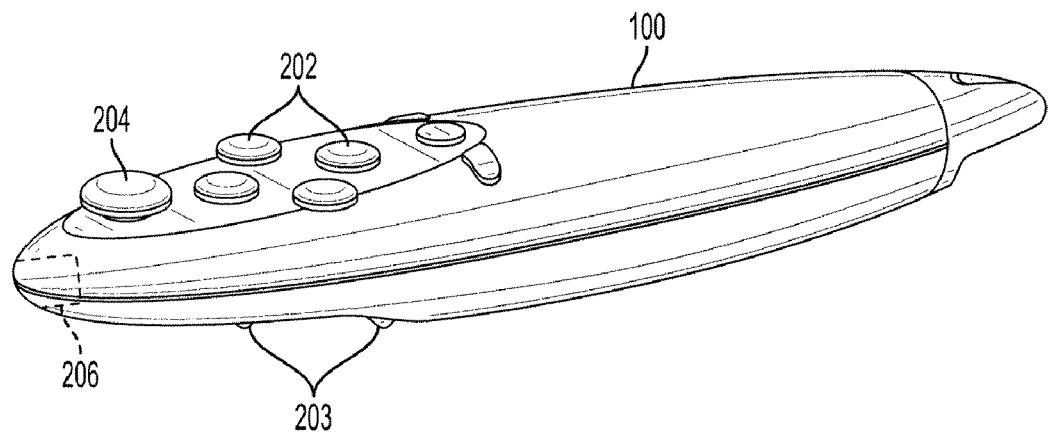
FIG. 2 illustrates an exemplary controller device, in accordance with an embodiment of the invention.

FIG. 2 illustrates an exemplary controller 100. The controller 100 as shown is designed to be handheld by the user 102. Various buttons 202 are included for providing input to the interactive program. The particular functions of the buttons 202 are determined by the interactive program, and each of the buttons 202 may or may not be configurable or assignable by the user 102 in accordance with specifications of the interactive program. Trigger buttons 203 and joystick 204 provide additional intuitive mechanisms for generating user input. Though the controller 100 as shown is designed to be handheld, in other embodiments of the invention, the controller 100 may be designed for manipulation by the user 102 in other ways. For example, the controller 100 may be attached to the user 102 by means which are known in the art, such as a strap or harness. Or the controller 100 may be mounted to or take the form of an object which may be moved under the control of the user 102. For example, the controller 100 may be part of a steering wheel assembly, an instrument-like device, or other devices or assemblies which may exhibit movement for the purpose of providing input to the interactive program.

Figure 3:
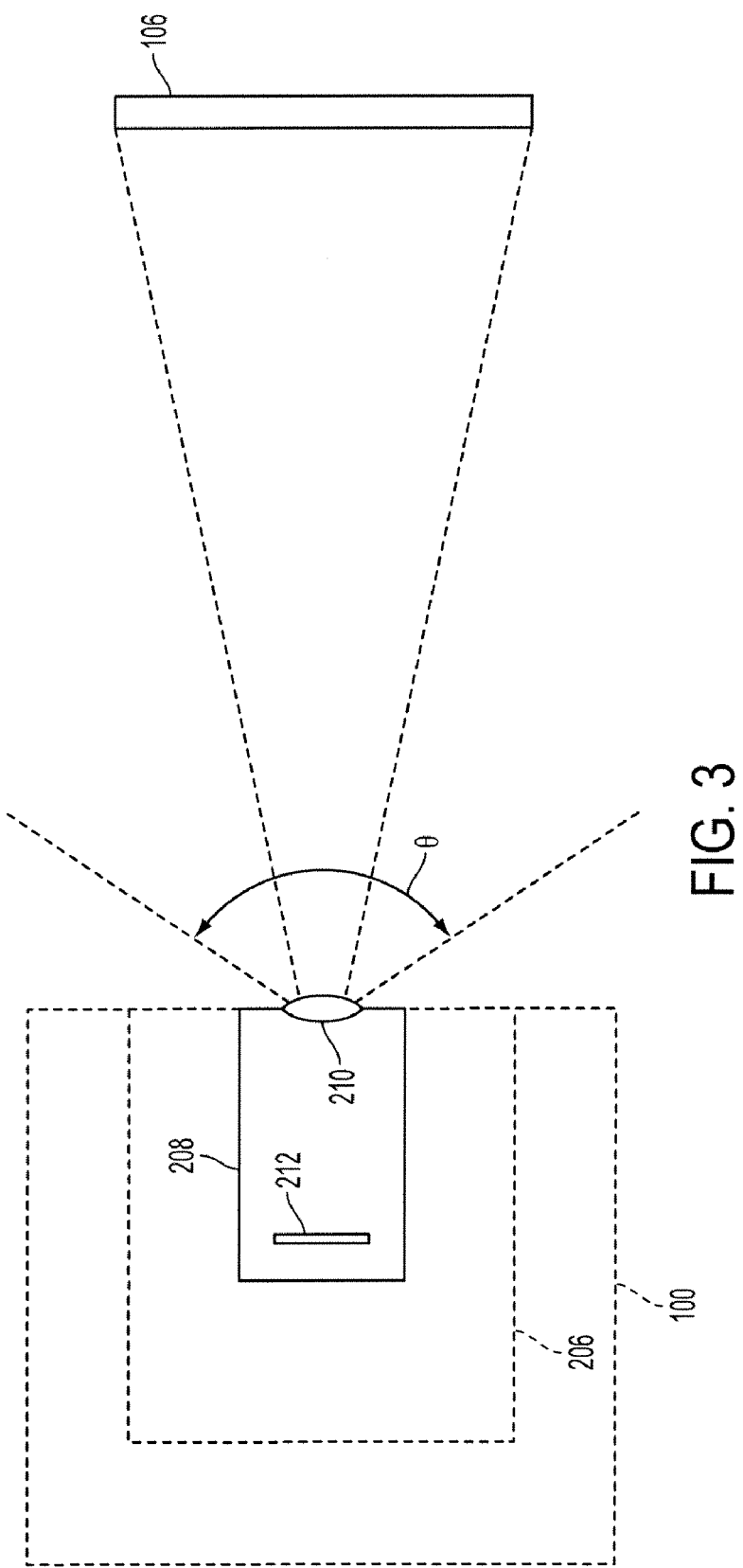
FIG. 3 illustrates a detailed view of a motion capture subassembly.

Additionally, the controller 100 includes a motion capture subassembly 206, which consists of various hardware components specialized to enable determination of the position and motion of the controller 100. FIG. 3 illustrates a detailed view of a motion capture subassembly 206 which includes an RGB camera 208. The RGB camera 208 includes a lens 210 and an RGB sensor 212. The RGB camera 208 has a field of view shown by the angle θ, and is utilized to capture images of the display 106. Based on the orientation and the perspective distortion of the display in the captured images, the position of the controller 100 is determined And as the position of the controller 100 is tracked over time, so the motion of the controller 100 is ascertained.

In one embodiment, the lens 210 of the RGB camera 208 is a wide-angle lens. The use of a wide-angle lens provides a degree of latitude so that the controller 100 (and by extension, the RGB camera 208) may be maneuvered to various positions and orientations while still maintaining the display 106 within its field of view. In another embodiment, the lens 210 is a fish-eye lens, which is a type of wide-angle lens having an extremely wide field of view. In some embodiments, the field of view afforded by the fish-eye lens is approximately in the range of 270 degrees. In other embodiments, the field of view of the fish-eye lens may be greater than or less than approximately 270 degrees. In other embodiments of the invention, the controller 100 may include multiple RGB cameras with overlapping fields of view, so that the combined field of view of the multiple RGB cameras is very wide. The multiple cameras may be different types cameras, such as normal, wide-angle fish-eye lenses, etc. In one embodiment, the controller 100 is configured with multiple cameras so as to have a full 360 degree field of view along all axes, and thus may be oriented in any manner possible while still being able to detect the display 106 provided that the line-of-sight to the display 106 is not obstructed.

It is noted that wide-angle lenses such as fish-eye lenses exhibit optical distortion to varying degrees. Generally, the wider the field of view of a given lens, the greater the amount of optical distortion, as the image plane which is increasingly curved in wider-angled lenses, is nonetheless captured onto a substantially planar surface (the sensor of the camera). However, the optical distortion characteristics of a given lens are predictable. Hence, for the purposes of this disclosure, it will be understood by those skilled in the art that such optical distortion inherent in a wide-angle lens is taken into account when determining the position and orientation of the controller 100 based on captured images of the display 106.

Additional details, embodiments, and methods for determining the position and motion of a controller are provided in related U.S. patent application Ser. No. 12/623,352, filed Nov. 20, 2009, which is incorporated herein in its entirety.

To determine the position, orientation, and movement of the controller 100 during activity with the interactive program, the controller 100 utilizes its RGB camera 208 to track the outer frame of the display 106. As the controller is moved to different positions and orientations, so the size, shape, and orientation of the display 106 in images captured by the RGB camera 208 change accordingly. These changes in the RGB image of the display 106 are the result of both perspective distortion and the optical qualities of the lens 210 in the RGB camera 208.

Figure 4C:
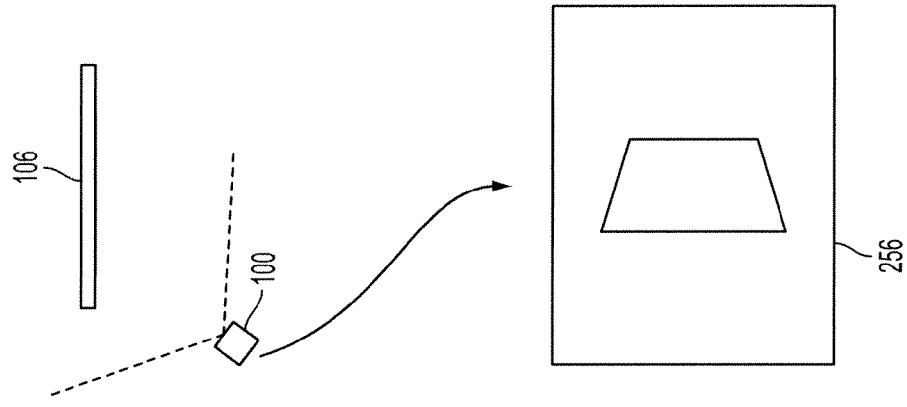
Figure 4B:
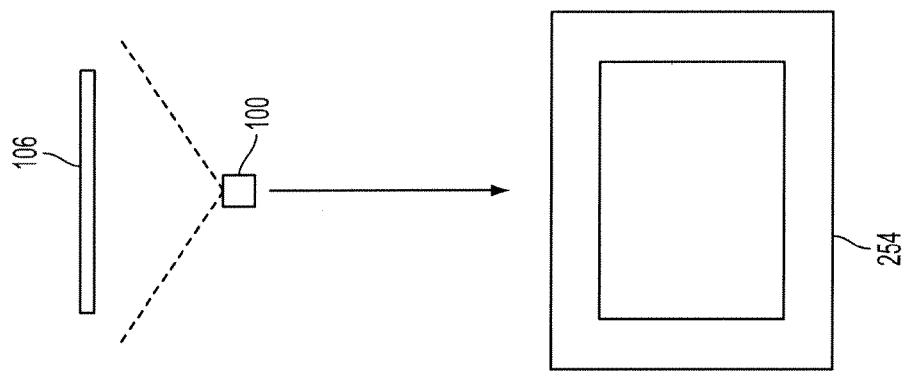
Figure 4A:
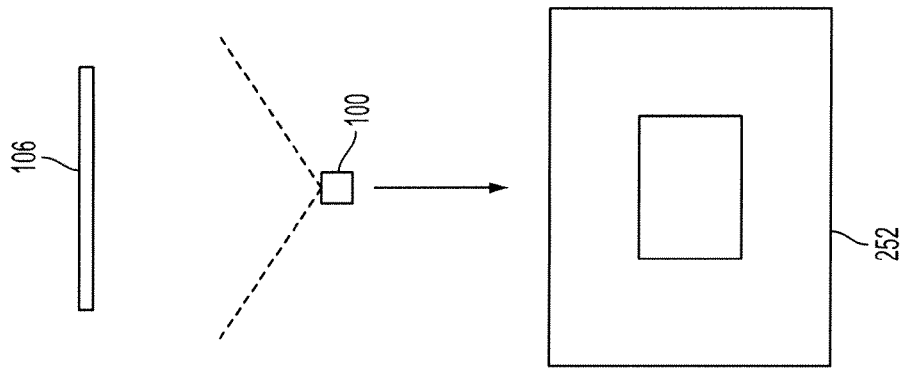

With reference to FIGS. 4A, 4B, and 4C, overhead views of the controller 100 at various locations in relation to the display 106 are shown. In FIG. 4A, the controller 100 is located in front of the display 106, such that the display 106 appears in a captured image 252 taken by the RGB camera 208 as shown. In FIG. 4B, the controller 100 has been moved closer to the TV. The result as shown in the captured image 254 is that the display 106 appears larger in the image when the controller 100 is closer to the display 106. At FIG. 4C, the controller 100 has been moved to the left side of the display 106. As a result, the image of the display 106 as seen in the captured image 256 exhibits perspective distortion resulting from the location of the controller 100. The left side of the display 106 appears taller in the image 256 than the right side of the display 106, and the overall appearance of the display 106 appears to be shortened in width. The perspective distortion effects resulting from movement of the controller 100 are predictable, and as such, the location of the controller 100 can be determined by examining captured images of the RGB camera 226 and analyzing the perspective distortion of the display.

With reference to FIG. 4D, an overhead view of the controller 100 in relation to the display 106 is illustrated, wherein the yaw of the controller 100 has been changed in comparison to that of FIG. 4A. Specifically, the yaw of the controller 100 has been negatively shifted (shifted towards the left) relative to the display 106. The result is that in the captured image 258, the display appears shifted towards the right side of the image. Moreover, the display may exhibit some perspective distortion wherein the left side of the display appears shorter than the right side.

With reference to FIG. 4E, an overhead view of the controller 100 in relation to the display 106 is illustrated, wherein the roll of the controller 100 has been changed in comparison to that of FIG. 4A. Specifically, the roll of the controller 100 has been positively adjusted (clockwise rotation) relative to the display 106. The result is that in the captured image 260, the display appears to be tilted in a counterclockwise fashion.

With reference to FIG. 4F, a side view of the controller 100 in relation to the display 106 is illustrated, wherein the pitch of the controller 100 has been changed in comparison to that of FIG. 4A. Specifically, the pitch of the controller 100 has been positively shifted (shifted upwards) relative to the display 106. The result is that in the captured image 262, the display appears shifted towards the bottom of the image. Moreover, the display may exhibit some perspective distortion wherein the top side of the display appears shorter than the bottom side.

As can be seen from the foregoing embodiments, the position and orientation of the controller 100 relative to the display 106 can be determined by analyzing RGB images of the display captured by the RGB camera 208 at the controller 100. The appearance of the display 106 within the captured RGB images will change in accordance with changes in the position, yaw, pitch, and roll of the controller 100 relative to the display 106.

In various embodiments of the invention, the appearance of the display 106 as captured by the RGB camera 226 is tracked by specifically tracking the outer frame of the display 106. The outer frame of many displays is generally of a uniform color (often a dark color such as black or gray) which is conducive to tracking. Furthermore, the display may include characteristic design items such as a logo or light indicating that the display is operating which remain stationary and uniform during operation. These design items may provide additional features which can be tracked for the purpose of determining the position, orientation and movement of a controller.

Figure 5A:
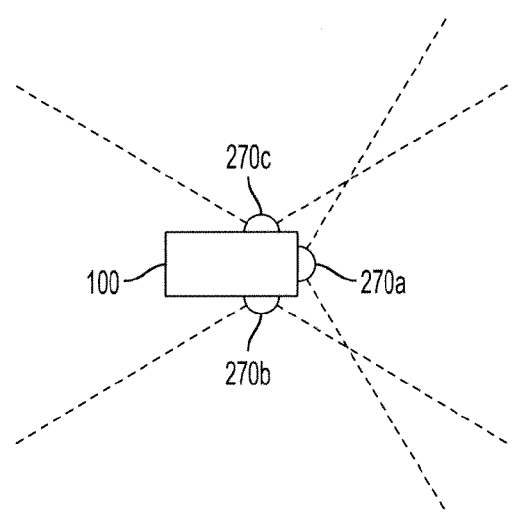
FIG. 5A illustrates an embodiment of a controller having multiple cameras, in accordance with an embodiment of the invention.
Figure 5B:
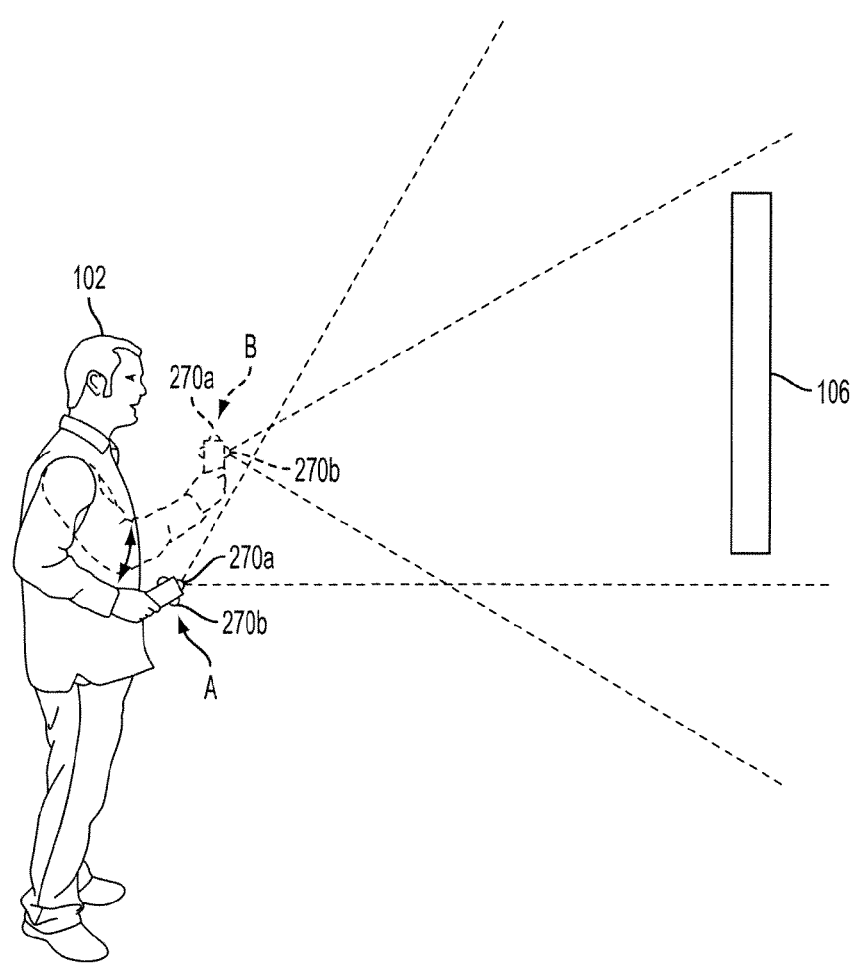
FIG. 5B illustrates a user holding a controller at different positions, in accordance with an embodiment of the invention.

With reference to FIG. 5A, an embodiment of a controller 100 having multiple cameras 270a, 270b, and 270c is shown. The multiple cameras have overlapping fields of view so as to provide a very wide aggregate field of view for the controller 100. Accordingly, the controller 100 may be maneuvered to a variety of positions and orientations while still retaining the ability to capture images of a display. As shown at FIG. 5B, a user holds the controller 100 at an initial position A, such that the display 106 lies within the field of view of the camera 270a. However, as the user 102 moves the controller 100 to a position B, the display 106 is no longer in the field of view of camera 270a, but falls within the field of view of camera 270b. By employing multiple cameras with overlapping fields of view, the display 106 can be tracked by the controller in a very flexible manner. This provides the user with freedom of movement when using the controller as well as a broad range of motion and orientation which may be utilized as input for an interactive program.

Figure 6:
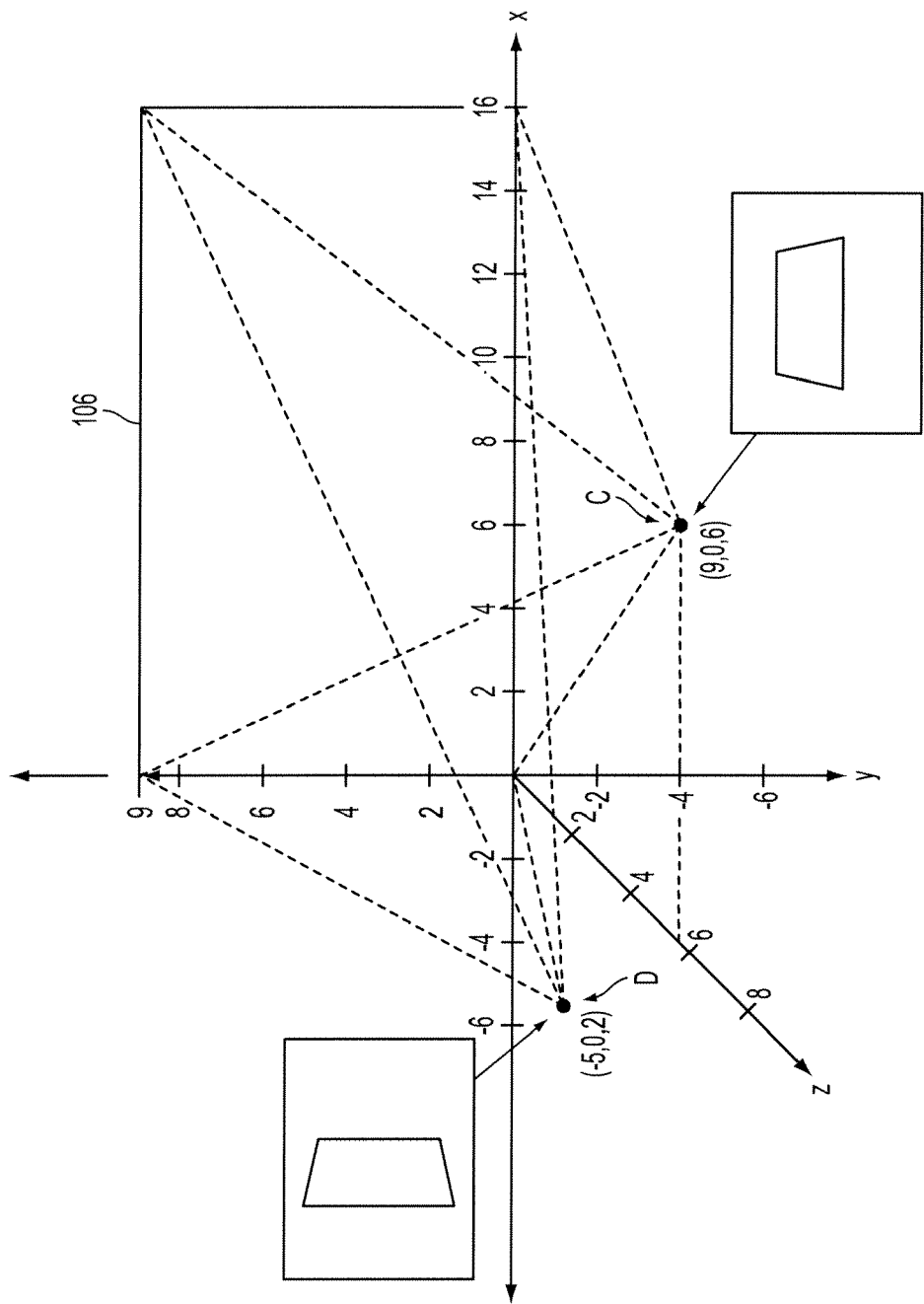
FIG. 6 illustrates a three-dimensional coordinate system for characterizing the position and movement of a controller, in accordance with an embodiment of the invention.

In one embodiment of the invention, a three-dimensional coordinate system is utilized for characterizing the position and movement of the controller. An example is shown at FIG. 6, in which a horizontal x axis and a vertical y axis are perpendicularly oriented in the plane defined by the surface of the display 106. A Z-axis is normal to the surface of the display 106 and describes distance from the plane defined by the surface of the display 106. In various embodiments of the invention, the origin of such a coordinate system may be located as desired, such as at the center of the display 106, at one of the corners of the display 106, or at another predetermined location. As shown at FIG. 6, the origin of the three-dimensional coordinate system is situated at the lower left corner of the display 106.

When a controller is located at a position C, as shown with continued reference to FIG. 6, a captured image of the display 106 by a camera on the controller produces an image of the display having a characteristic perspective distortion. By analyzing this perspective distortion, it is determined that the position of the controller at position C is defined by the coordinates (9, 6, 0). Likewise, when the controller is moved to a location D, image analysis of a captured image of the display 106 enables determination that the controller position has the coordinates (−5, 0, 2).

The foregoing exemplary Cartesian coordinate system is provided by way of example only, and not by way of limitation. In various embodiments of the invention, the specific units of the coordinate system or of individual axes may vary, as may the specific location of the origin. Moreover, in alternative embodiments of the invention, other coordinate systems may be utilized to describe the spatial position of the controller, such as a cylindrical coordinate system or a spherical coordinate system.

In accordance with another aspect of the invention, the functionality of an action of a controller may be determined based on the controller's position or orientation. For the purposes of this disclosure, an action of the controller may be any type of input which is capable of being received by the controller and communicated to an interactive program. Thus, the action of the controller may result from a user activating or using an input mechanism of the controller. Examples of possible input mechanisms of the controller include a button, trigger, joystick, trackball, touchpad, pressure sensor, light sensor, audio sensor, microphone, etc. as well as combinations thereof. Moreover, the action of the controller may be a movement of the controller itself, such as a change in the controller's location and/or orientation. Movement of the controller may be any type of movement which is capable of being detected for the controller, such as gestures of various kinds within a region in which the location and orientation of the controller can be determined.

In some embodiments of the invention, the change in the functionality of the action of the controller in accordance with a change in its position or orientation may be gradual. For example, a property of the controller action may be adjusted in a continuous manner according to changes in the controller's position or orientation. In other embodiments, the change in the functionality of the controller action may be discrete, so that when the controller is moved beyond a threshold or into a particular spatial zone, its function changes in a discrete manner. These and other embodiments illustrating position-based function determination for an action of a controller are herein described.

Figure 7:
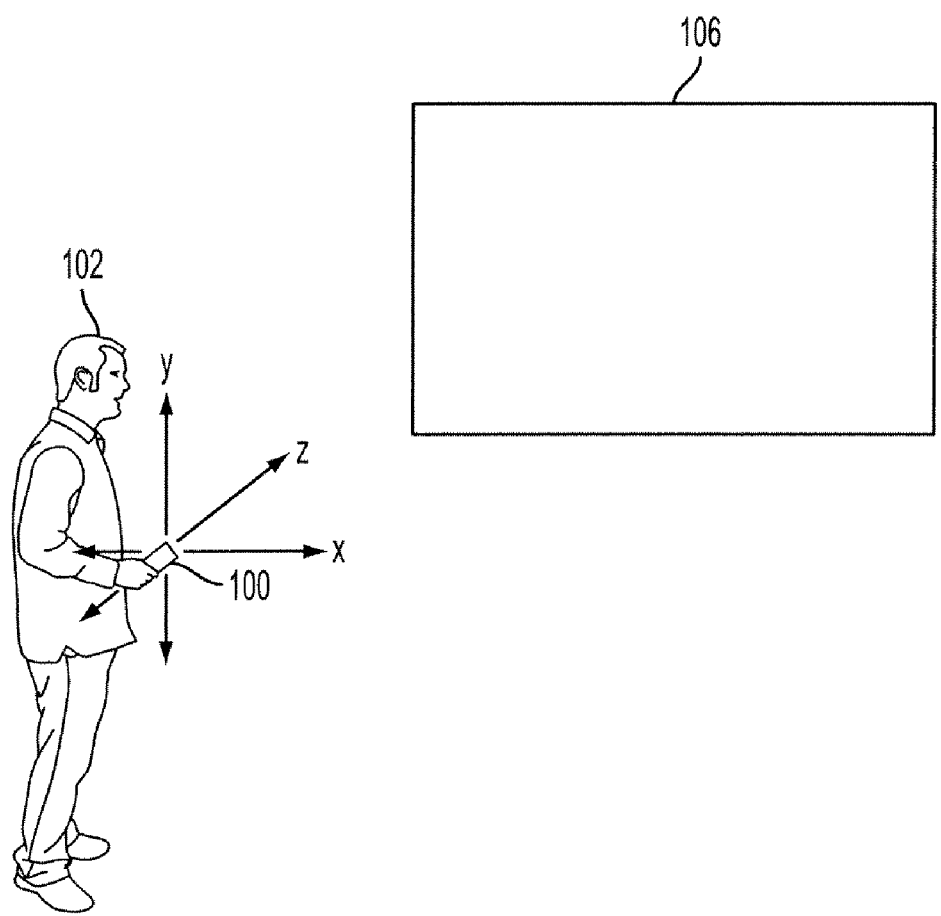
FIG. 7 illustrates a user holding a controller in front of a display, in accordance with an embodiment of the invention.

In one embodiment, movement of a controller in a particular direction causes the functionality of an action of the controller to be adjusted in a continuous manner. For example, with reference to FIG. 7, a user 102 holding a controller 100 in front of a display 106 is shown. The position of the controller 100 is determined based on perspective distortion and position and orientation of the display in captured images of the display taken by the controller 100. X and y axes as shown are parallel to the plane of the display 106, representing movement of the controller in directions parallel to the plane of the display. A z-axis as shown is orthogonal to the plane of the display 106, representing distance of the controller 100 from the plane of the display 106. In various embodiments, movement along one or more of the axes causes a continuous change to an action of the controller. For example, movement along the z-axis may cause the "intensity" of a button pressed on the controller to vary, as determined for purposes of an interactive program. In other words, pressing the button may convey different values or levels depending on the position of the controller, the values or levels being interpreted by the interactive program for a function and to cause an action within the environment of the interactive program.

In one embodiment, as the controller is moved closer to the plane of the display 106 along the z-axis, so the intensity of a button pressed on the controller increases; whereas when the controller is moved further away from the plane of the display along the z-axis, so the intensity communicated by the button press decreases. In another embodiment, as the controller is moved vertically upwards along the y-axis, so the intensity of a button pressed on the controller increases; whereas when the controller is moved vertically downwards along the y-axis, so the intensity communicated by the button press decreases. The foregoing embodiments are provided by way of example only, and not by way of limitation. Those skilled in the art will recognize that numerous other embodiments may be devised within the scope of the invention. In other embodiments, movement of the controller 100 along any particular direction may be correlated to the variability of a specific action of the controller, such as the intensity of a button or trigger which is pressed. In one embodiment, movement of the controller relative to a specific location correlates to the variability of a specific action of the controller. For example, movement towards or away from the specific location may cause a change in an action of the controller.

In one embodiment, movement of the controller 100 in a particular direction causes the intensity of an input provided by way of a joystick on the controller 100 to vary. For example, as the controller is moved along the z-axis closer to the plane of the display 106, so the intensity of input via the joystick (or the joystick's sensitivity) may decrease. This may be useful as a feature in an interactive program where the joystick controls a change in direction or movement of some sort. In the present example, as the user 102 moves the controller 100 closer to the plane of the display 106, so the user is more easily able to provide more finely controlled input via the joystick on the controller 100, as the sensitivity of the joystick is decreased. Whereas, when the controller 100 is moved away from the plane of the display 106, then the input via the joystick is less easily controlled at a fine-level, but able to provide faster changes of a larger scale, as the sensitivity of the joystick is increased. In other embodiments of the invention, movement of the controller 100 in any particular direction may be correlated to the intensity of input as provided via a joystick on the controller 100.

In a similar fashion, a change in the orientation of the controller 100 may be correlated to the variability of an action of the controller 100. In one embodiment, a change in the pitch of the controller causes the intensity of a button pressed or a joystick input to vary. For example, a positive change in pitch may be correlated to an increase in intensity. In other embodiments, changes to a particular action of the controller may be correlated to changes in the roll or yaw. In other embodiments, changes to a particular action of the controller may result from a combination of changes in pitch, roll, or yaw.

In accordance with various embodiments of the invention, a discrete change to an action of a controller's input mechanism may be correlated to a change in a position of the controller. For example, when the controller is moved beyond a certain threshold or into a particular spatial zone, then a function of an action or input mechanism of the controller, such as the particular function associated with pressing a button or moving a joystick on the controller, is changed. The change in the function of the input mechanism of the controller may be one of degree, such as a change in the intensity or level of input provided by an input mechanism, or a complete change of the input mechanism's purpose altogether—e.g. causing a button press to perform an entirely different action depending on the position of the controller. In another example, the aforementioned action or input mechanism of the controller may be the actual movement of the controller, which may change as a result of positioning the controller within a particular spatial zone.

Furthermore, it is noted that because the position of the controller is determined based on perspective distortion and orientation of the display within captured images of the display taken at the controller, the aforementioned spatial zones may be determined to be at any location where the controller is able to capture images of the display sufficient to enable determination of the controller's position.

Additionally, in some embodiments, the spatial zones for which a function of an action or input mechanism of a controller is determined may be dynamically generated. In one embodiment, the location of a particular zone may change or move over time. In another embodiment, a spatial zone may be generated on an as-needed basis in association with a particular portion or function of an interactive program.

Several exemplary embodiments illustrating adjustment of the function of an action or input mechanism of a controller based on the controller's position are provided herein with reference to the provided figures. However, those skilled in the art will realize many additional variations to the embodiments provided herein without departing from the scope of the present invention.

Figure 8:
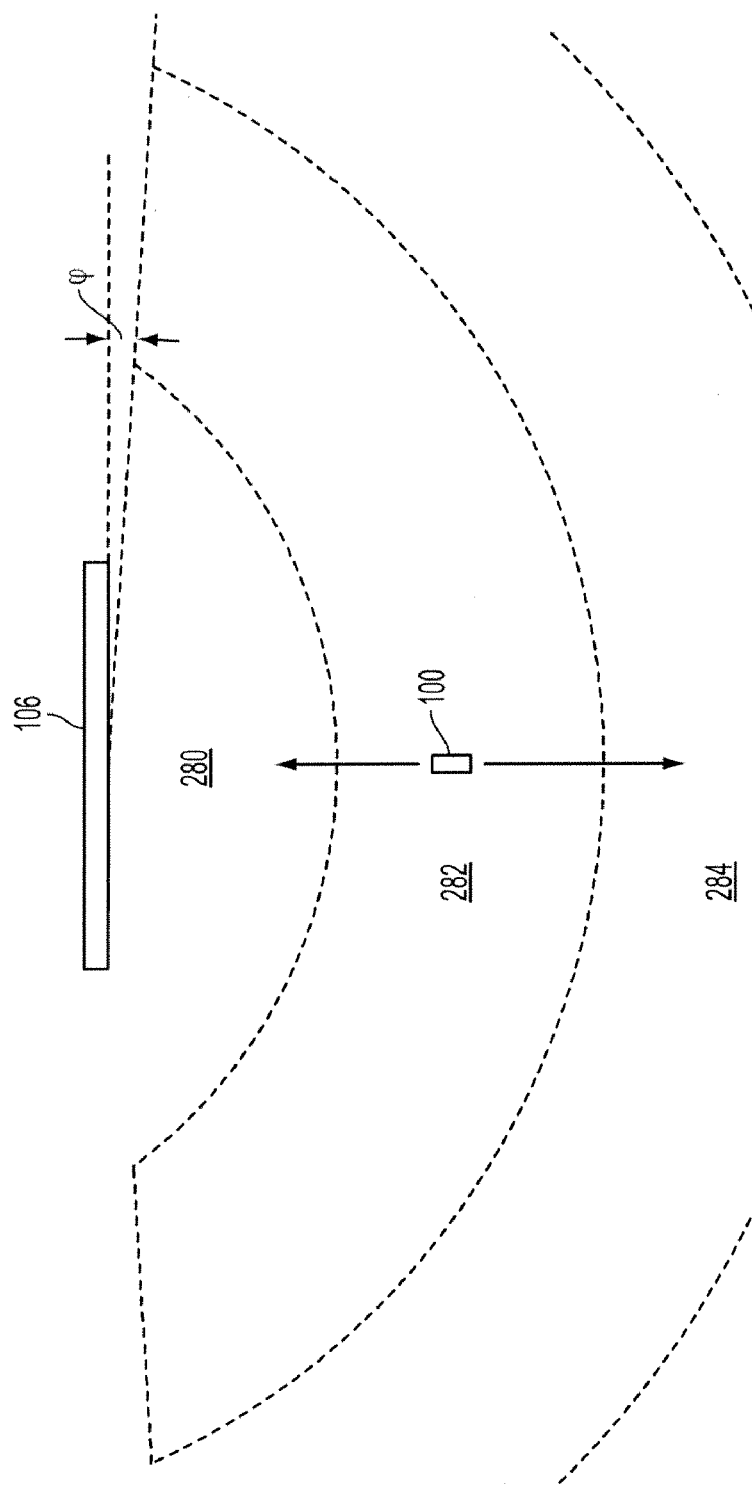
FIG. 8 illustrates an overhead view of an environment in which a user may interact with an interactive program displayed on a display, in accordance with an embodiment of the invention.

With reference to FIG. 8, an overhead view of an environment in which a user may interact with an interactive program displayed on a display 106 is shown. Various regions of the environment are delineated by dashed lines, as described further herein. The position of a controller 100 is determined by capturing images of the display 106 at the controller and then determining the controller's position based on analysis of the perspective distortion of the display 106 in the captured images, in accordance with principles discussed above. A region 280 comprises a null zone, wherein the position of the controller 100 cannot be determined based on captured images of the display because the controller 100 is either too close to the display 106 or the controller is located along a side of the display, and therefore unable to accurately track the outer frame of the display 106.

It is noted that as the controller 100 approaches a side of the display, it may become increasingly difficult to track the outer frame of the display, as the area of a captured image which is occupied by the display decreases and the sides of the display in the captured image appear closer to one another. The ability of the interactive system to determine the position of the controller 100 based on captured images of the display when the controller is located at the sides of the display will depend to a certain extent upon the sensitivity of the system and its various components and processing. Therefore, the required location of the controller along sides of the display may be approximated by a minimum angle φ defined by the plane of the display 106, a point at the center of the display, and the position of the controller 100. In one embodiment, location of the controller 100 at or above the minimum angle φ facilitates proper tracking of the display so as to enable the position of the controller to be determined.

In some embodiments of the invention, the controller 100 may include additional components for tracking movement and orientation of the controller, such as an accelerometer, magnetometer, and gyroscope. When such components are included in the controller 100, then it is possible to track relative movement and orientation of the controller even when it is located in the null zone 280. However, such components would not enable accurate determinations of position and movement to the same extent as is possible with the image-based method based on captured images of the display taken at the controller as described above. Therefore, it is preferable for the controller 100 to remain outside of the null zone 280 for purposes of determining the functionality of an action or input mechanism of the controller based on the controller's position.

With continued reference to FIG. 8, a zone 282 and zone 284 define spatial regions for which the function of an action of the controller 100 is determined As shown, zone 282 and zone 284 are approximately shaped like semi-circular bands, so that in order to move from one zone to the other, the user may maneuver the controller 100 either towards or away from the display 106. When the controller 100 is located within the zone 282, then a function of an action or input mechanism of the controller, such as a button or joystick or the movement of the controller itself, has a determined function. When the controller is moved to zone 284, then the input device of the controller is determined to have a modified version of the function or else a different function entirely. For example, movement of the controller 100 from zone 282 to zone 284 may cause the intensity conveyed by pressing a particular button to decrease. Or it may cause the entire function of the button to change.

Figure 9:
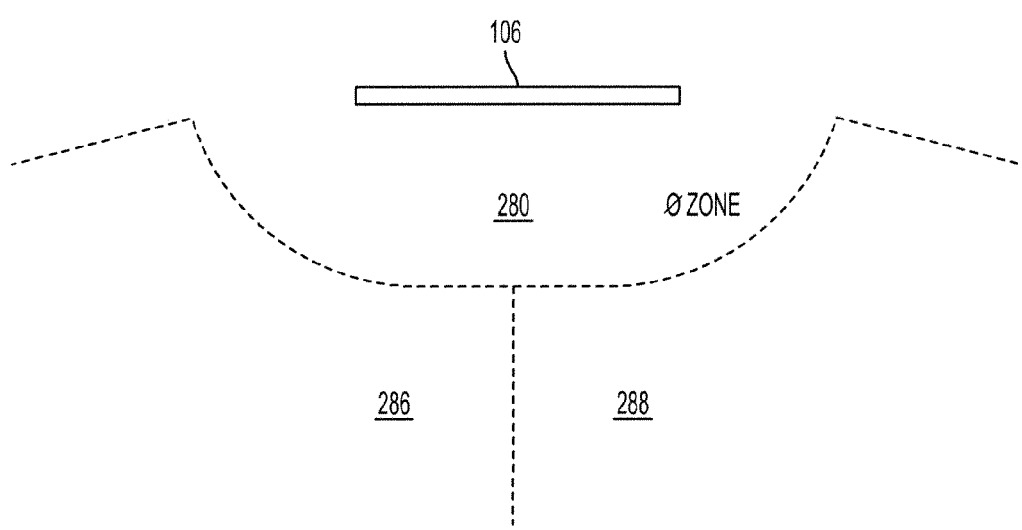
FIG. 9 illustrates an overhead view of an interactive environment for providing input to an interactive program, in accordance with an embodiment of the invention.

With reference to FIG. 9, an overhead view of an interactive environment is shown, in accordance with an embodiment of the invention. A display 106 displays an interactive program to a user. The position and motion of the controller is determined based on perspective distortion and orientation of the display 106 in captured images of the display taken at the controller. Zone 286 and zone 288 are spatial regions for which the functionality of an input mechanism of a controller is determined For example, when the controller is located within either of zone 286 or zone 288, then the functionality of an action or input mechanism such as pressing a button on the controller is determined to have a particular function for purposes of the interactive program. Whereas, when the controller is moved to zone 288, then the functionality of the same action or input mechanism (pressing the same button) changes to a different function. As shown, the zones 286 and 288 are adjacent to one another, relative to the display 106, so that a user may move the controller laterally in order to effect changes to the functionality of the action or input mechanism of the controller.

With continued reference to FIG. 9, in another embodiment of the invention, the zones 286 and 288 may be useful in the context of two users interacting with the same interactive program displayed on the display 106, such as an interactive video game. For example, an action or input mechanism of a first controller held by a first user in zone 286 may have a particular function with respect to the first user's character in the video game; whereas an action or input mechanism of a second controller held by a second user in zone 288 may have the same function with respect to the second user's character in the video game. When the first controller is moved into zone 288, then the function of the first controller's input mechanism is changed. Likewise, when the second controller is moved into zone 286, then the function of the second controller's input mechanism may change in the same manner, or a different manner.

In one embodiment, each of the zones 286 and 288 operate as a designated zone for one player, and a "keep-out" zone for the other. For example, the input mechanism of the first user's controller may be operative in zone 286, but become non-operative when the first user's controller is determined to be located in zone 288. And likewise, the input mechanism of the second user's controller may be operative in zone 288, but become non-operative when moved into zone 286. In this manner, the zones 286 and 288 may help to maintain separation of the first and second user's controllers, and by extension, the first and second users.

In other embodiments, an audio, visual or tactile signal may be triggered when the first or second user's controller moves outside of its designated zone. For example, a sound such as a beep may be played when a controller is determined to have moved outside its designated zone. A speaker for playing the sound may be provided at the display, the computing device, the controller, or elsewhere for this purpose. In one embodiment, a visual cue is provided when a controller moves outside its designated zone. Examples of a visual cue include a visual indicator presented on the display, activating a light or other visual indicator on the controller, etc. In one embodiment, tactile feedback is provided when a controller moves outside its designated zone by vibrating the controller so that a user holding the controller will feel the vibration. In still other embodiments, other types of feedback for informing a user that his/her controller has moved outside its designated area may be utilized within the scope of the present invention.

Figure 10:
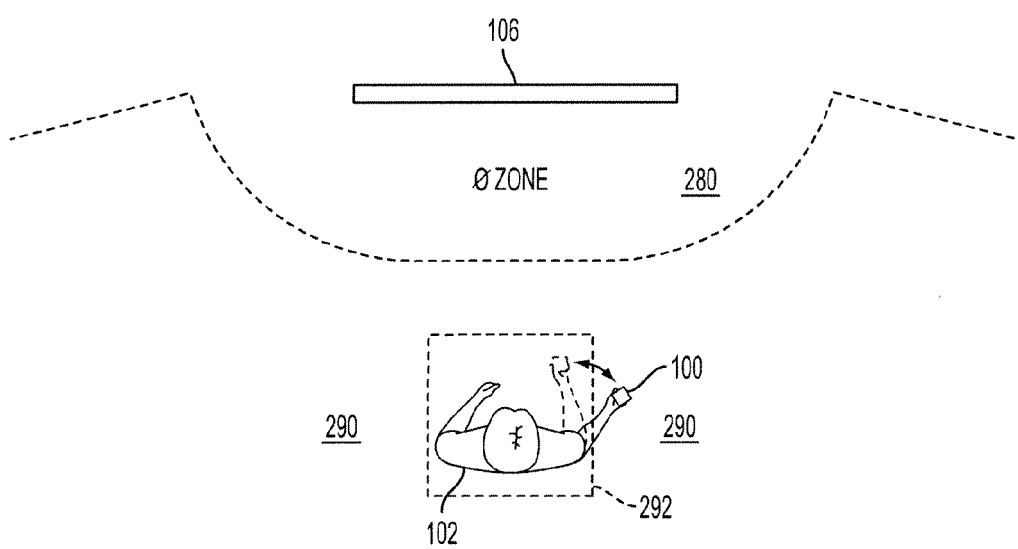
FIG. 10 illustrates an overhead view of an interactive environment for providing input to an interactive program, in accordance with an embodiment of the invention.

With reference to FIG. 10, an overhead view of an interactive environment is shown, in accordance with an embodiment of the invention. The interactive environment includes a display 106 which displays an interactive program. A user 102 is shown holding a controller 100 for interfacing with the interactive program. The position and motion of the controller 100 are tracked in accordance with principles described above, based on analysis of captured images of the display 106 taken at the controller 100. The interactive environment includes zone 290 and zone 292, which are spatial regions for which the functionality of an action or input mechanism of the controller 100 is shown. As shown, the zone 292 is a bounded region within the larger zone 290. Thus, as the user 102 moves the controller 100 from one zone to the other, so the functionality of an input mechanism such as pressing a button, moving a joystick, or moving the controller itself, is determined. In various embodiments, the change in functionality may be a change in intensity or level, or may be a change to a completely different function with respect to the interactive program. In one embodiment, the change in functionality of the action or input mechanism of the controller is such that the action or input mechanism is operative when the controller 100 is located within the zone 290 and non-operative when located in the zone 292. In this manner, the user 102 may be required to maintain a position so that the controller 100 is within the zone 292.

Figure 11:
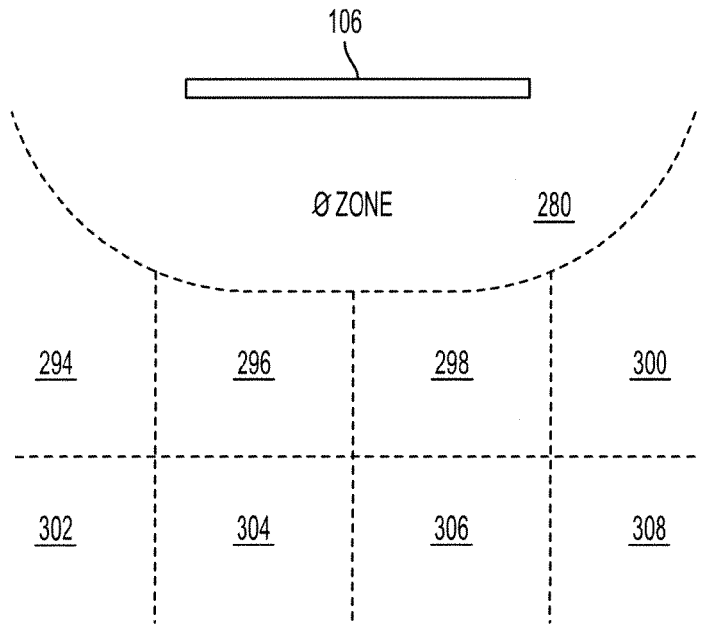
FIG. 11 illustrates an overhead view of an interactive environment for providing input to an interactive program, in accordance with an embodiment of the invention.

With reference to FIG. 11, an overhead view of an interactive environment is shown, in accordance with an embodiment of the invention. The interactive environment includes a display 106 which displays an interactive program. The interactive environment includes zones 294, 296, 298, 300, 302, 304, 306 and 308, which are spatial regions for which the functionality of an action or input mechanism of a controller is determined. As shown, zone 296 and zone 298 are bounded regions within the larger interactive environment, whereas the zones 294, 300, 302, 304, 306, and 308 are unbounded on at least one side. As a user moves the controller from one zone to another, so the functionality of an action or input mechanism such as pressing a button or moving a joystick is changed. In one embodiment, the action or input mechanism whose functionality is changed is the movement of the controller itself. It will be recognized by those skilled in the art that the interactive environment shown may be subdivided in any number of ways. The presently described examples are intended as merely exemplary embodiments, and not limiting the scope of the present invention in any way.

Figure 12:
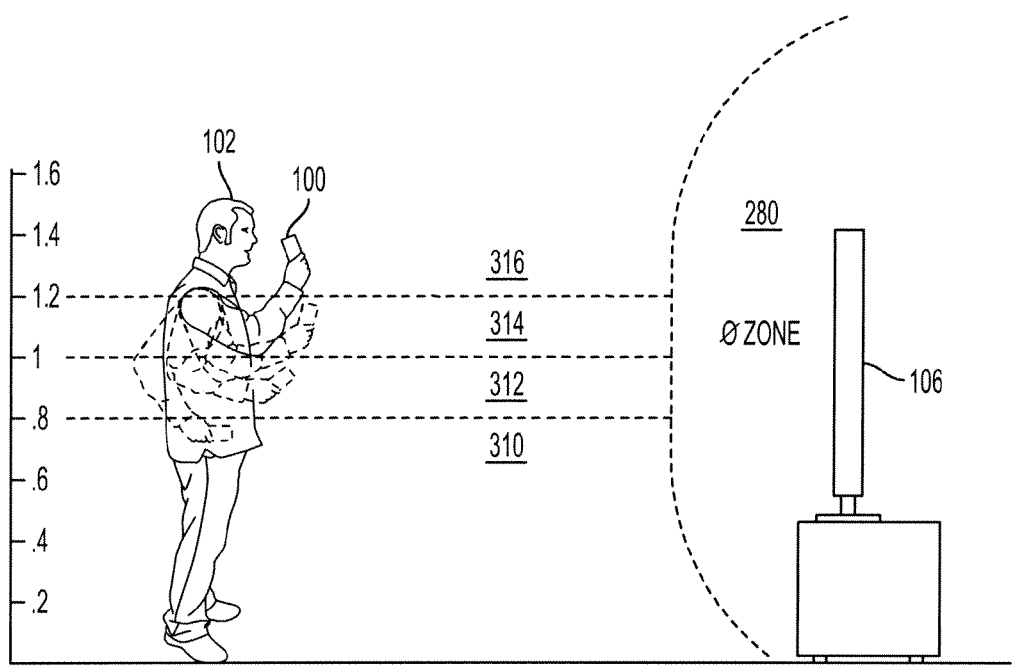
FIG. 12 illustrates a side view of an interactive environment for providing input to an interactive program, in accordance with an embodiment of the invention.

With reference to FIG. 12, a side view of an interactive environment is shown, in accordance with an embodiment of the invention. An interactive program is displayed on display 106. The user 102 provides input to the interactive program via controller 100. The zones 310, 312, 314 and 316 are spatial regions in which the functionality of an action or input mechanism of the controller 100 is determined. The zones 310, 312, 314 and 316 are vertically arranged so that as the user 102 moves the controller 100 up and down, the controller moves through the various zones. When the controller 100 is located in each of the zones, the action or input mechanism of the controller 100 is specified to have a particular function. As the controller moves one zone to the next, so the functionality of the action or input mechanism changes. In one embodiment, as the controller is moved from zones 310 to 312 to 314 to 316, so the intensity or level of input associated with the input mechanism of the controller 100 is increased. As the zones 310, 312, 314 and 316 are vertically arranged, this may provide an intuitive mechanism for a user to provide increased intensity through an input mechanism.

Figure 13:
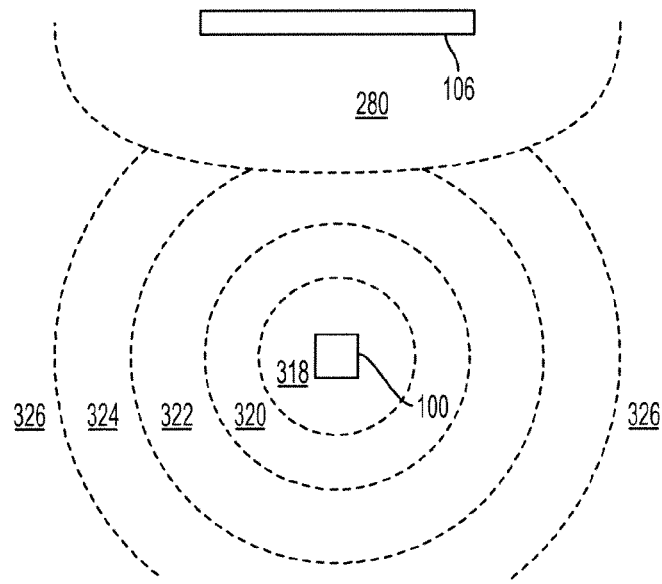
FIG. 13 illustrates an overhead view of an interactive environment for providing input to an interactive program, in accordance with an embodiment of the invention.

With reference to FIG. 13, an overhead view of an interactive environment is shown, in accordance with an embodiment of the invention. An interactive program is displayed on display 106. Each of the zones 318, 320, 322, 324, and 326 defines a spatial region for which the functionality of an action or input mechanism of a controller 100 is determined when the controller 100 is located within that particular zone. The zones 318, 320, 322, 324, and 326 are arranged in a concentric manner, so that as the controller 100 is moved from the central zone 318 in any direction, the effect on the functionality of the action or input mechanism of the controller 100 will generally be the same, in accordance with the zones that the controller moves through. The controller will move from zone 318 to zone 320, then to zone 322, then to zone 324, and then to zone 326. Each time the controller 100 enters a new zone, the functionality of the action or input mechanism of the controller 100 may change in a predetermined fashion.

Figure 14:
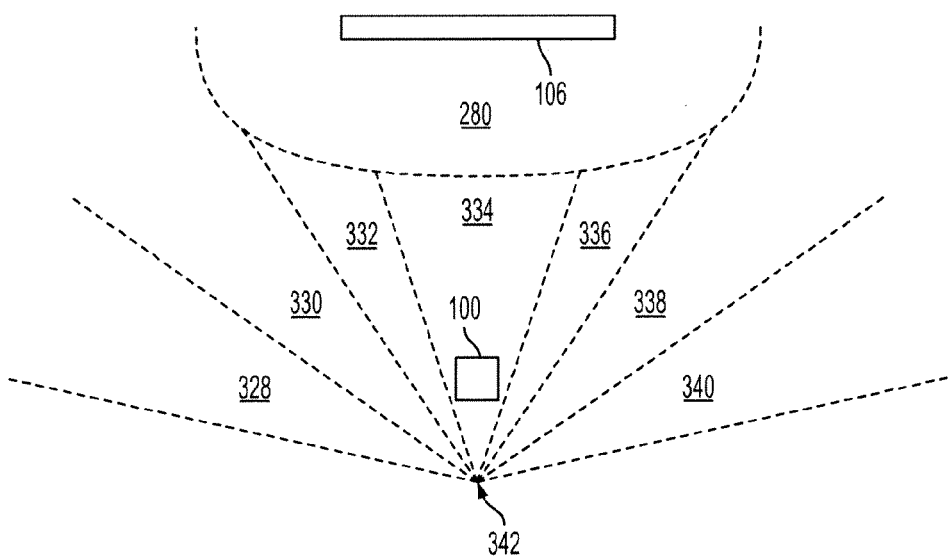
FIG. 14 illustrates an overhead view of an interactive environment for providing input to an interactive program, in accordance with an embodiment of the invention.

With reference to FIG. 14, an overhead view of an interactive environment is shown, in accordance with an embodiment of the invention. An interactive program is displayed on display 106. Each of the zones 328, 330, 332, 334, 336, 338, and 340 defines a spatial region for which the functionality of an action or input mechanism of a controller 100 is determined when the controller 100 is located within that particular zone. As shown in FIG. 14, each of these zones extends radially from a location 342, such that the zones have a wedge-like shape. Thus, the arrangement provided may be useful where it is desirable to adjust the function of the input mechanism of the controller 100 based on the controller's directional orientation with respect to a location.

Figure 15:
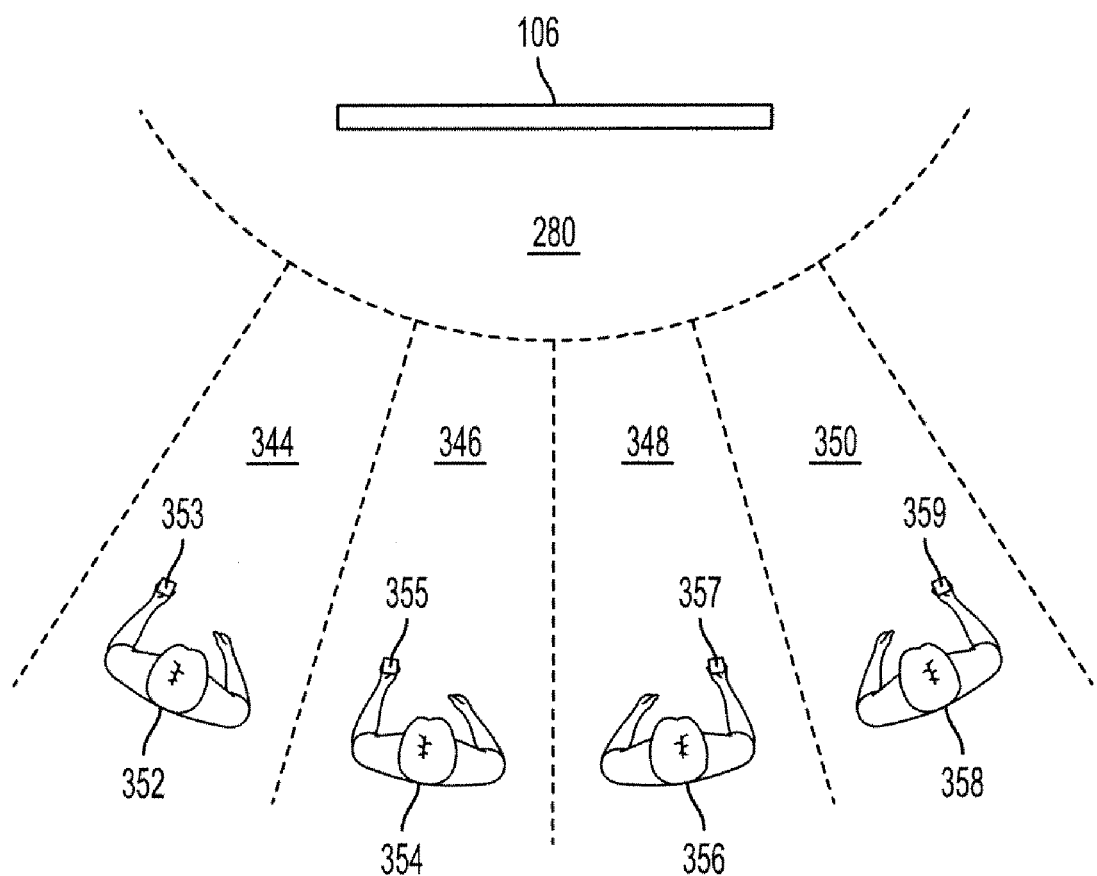
FIG. 15 illustrates an overhead view of an interactive environment for providing input to an interactive program, in accordance with an embodiment of the invention.

With reference to FIG. 15, an overhead view of an interactive environment for providing input to an interactive program is shown, in accordance with an embodiment of the invention. An interactive program is displayed on display 106. Each of the zones 344, 346, 348, and 350 defines a spatial region for which the functionality of an action or input mechanism of a controller is determined when the controller is located within that particular zone. In the embodiment shown, four users 352, 354, 356, and 358 are shown holding controllers 353, 355, 357, and 359 respectively. The users 352, 354, 356, and 358 are shown located in zones 344, 346, 348, and 350, respectively. The zones are approximately radially arranged about the display 106.

In one embodiment, each of the zones 344, 346, 348, and 350 functions as a designated zone for each of the controllers 353, 355, 357, and 359, respectively, and by extension, the associated users of the controllers. It is recognized that because the interactive system relies upon the ability to capture images of the display 106 at the controller, it is desirable to prevent users from blocking each other's controller's view of the display 106. Thus, by implementing designated spatial zones for each of the users, it is possible to help prevent users from blocking each other's controllers. For example, if user 354 maneuvers his controller 355 out of his designated zone 346, and into either of the adjacent zones 344 or 348, then the interactive program may communicate to the user 354 that his controller is out of its designated zone by any number of ways. For example, a message or other indicator may be displayed on the display 106 which calls attention to the controller 355 being out of its designated area. Or the interactive program may cause the controller 355 to exhibit vibrotactile feedback, or emit a sound or light, or some other mechanism for informing the user 354 that his controller 355 is not in its designated zone. In this manner, it is possible to promote order in the positioning of the multiple users of the interactive program. As shown, the zones 344, 346, 348 and 350 are immediately adjacent to each other. However, in other embodiments of the invention, the zones may be separated from each other by buffer zones. This may further help prevent users from accidentally interfering with each other's controllers, and/or accidentally bumping into each other.

Figure 16:
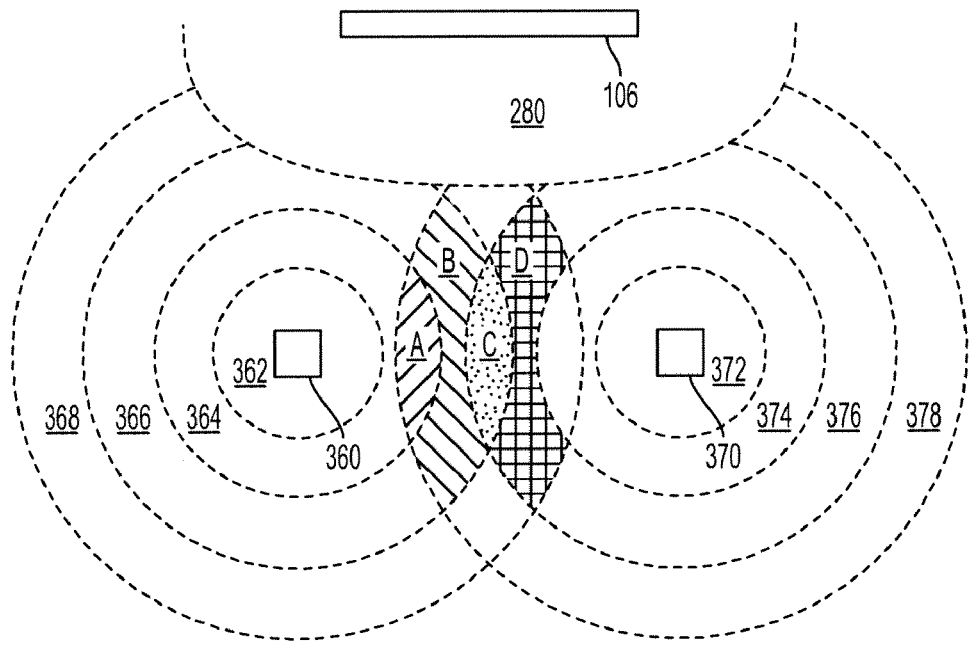
FIG. 16 illustrates an overhead view of an interactive environment for providing input to an interactive program, in accordance with an embodiment of the invention.

With reference to FIG. 16, an overhead view of an interactive environment for providing input to an interactive program is shown, in accordance with an embodiment of the invention. An interactive program is displayed on display 106. A controller 360 has corresponding zones 362, 364, 366, and 368. Each of the zones defines a spatial region for which the functionality of an action or input mechanism of a controller is determined when the controller is located within that particular zone. As shown, the zones 362, 364, 366, and 368 are arranged in a concentric fashion, so that as the controller 360 is moved outward from its corresponding center-most zone 362, it will pass through zones 364, 366, and 368 in that order. Similarly, a second controller 370 has corresponding zones 372, 374, 376, 378. The zones 372, 374, 376, and 378 are also arranged in a concentric fashion. As shown by regions A, B, C, and D, the concentric zones corresponding to the two controllers 360 and 370 intersect one another in various ways. Region A illustrates the intersection of zone 364 which corresponds to controller 360, and zone 378 which corresponds to controller 370. Region B illustrates the intersection of zone 366 which corresponds to controller 360, and zone 378 which corresponds to controller 370. Region C illustrates the intersection of zone 366 (controller 360) and zone 376 (controller 370). Region D illustrates the intersection of zone 368 (controller 360) and zone 376 (controller 370). Thus, the same spatial location may correspond to one zone for one controller and a different zone for the other controller.

While the presently illustrated example has been described with reference to two controllers having overlapping zones, in other embodiments, there may be more than two controllers with zones configured in any of various ways. The zones may be identical for each controller, or different in accordance with the interactive features to be affected by the zones for each particular controller. For example, in a multi-player game, each player may have different roles or have customizable options such as character types, weapons, etc. These variable aspects of a multi-player game may utilize a different set of zones for affecting the functionality of an input mechanism on each controller. Thus, each player may have a different set of zones assigned to their controller device. These zones may overlap in various ways depending on the location of the zones for each controller device.

Figure 17:
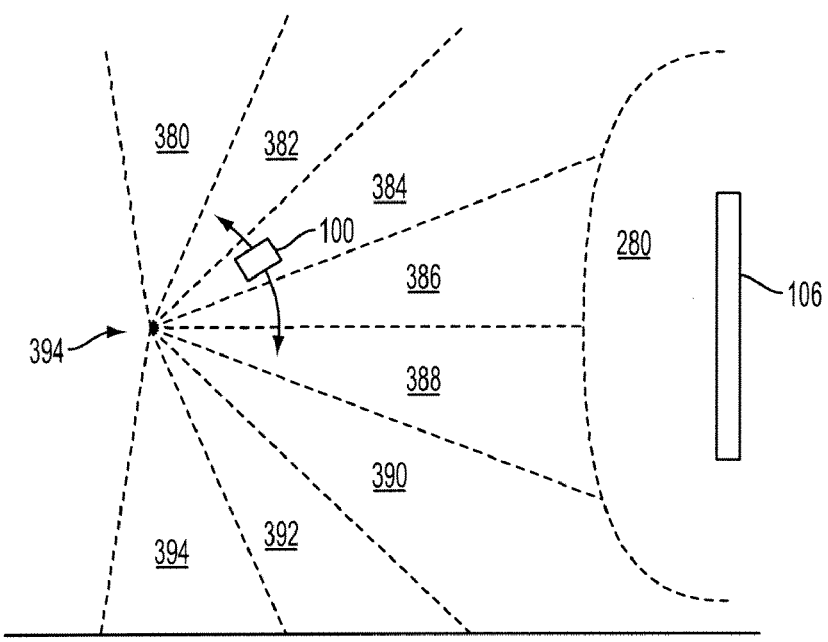
FIG. 17 illustrates a side view of an interactive environment for providing input to an interactive program, in accordance with an embodiment of the invention.

With reference to FIG. 17, a side view of an interactive environment for providing input to an interactive program is shown, in accordance with an embodiment of the invention. An interactive program is displayed on display 106. Each of the zones 380, 382, 383, 384, 386, 388, 390, and 392 defines a spatial region for which the functionality of an action or input mechanism of a controller 100 is determined when the controller is located within that particular zone. As shown, the zones are arranged in a radial fashion about a location 394, so that a user holding the controller 100 towards the display 106 can maneuver the controller 100 through the various zones by swinging it up and down. As the user so maneuvers the controller 100, the controller will generally follow an arc which causes the controller to pass through the zones. In one embodiment, movement of the controller 100 in an upwards direction, from zone 394, through zones 392, 390, 388, 386, 384, 382, to 380, causes an increase in intensity or level of an input mechanism of the controller 100 with each transition to the next zone. Movement in the opposite direction causes a decrease in the level of the input mechanism of the controller 100. In other embodiments of the invention, the zones may be grouped in various ways. For example, when the controller 100 is in any of zones 380, 382, 384 and 386, then the input mechanism of the controller 100 performs a first operation whose level or intensity varies depending on which of the zones 380, 382, 384 or 386 in which the controller 100 is located. Whereas, when the controller is in any of zones 388, 390, 392, or 394, then the input mechanism of the controller 100 performs a second operation whose level or intensity varies depending on which of the zones 388, 390, 392, or 394 in which the controller is located. In other embodiments, the zones may be grouped in any manner as is appropriate for the interactive program.

In accordance with embodiments of the invention, a user of an interactive program may provide input so as to define spatial zones for which the functionality of an input mechanism of a controller is determined For example, the user may maneuver the controller so as to define boundaries in space which are determined based on tracking the position and movement of the controller. These boundaries are then utilized by the interactive program to define the aforementioned spatial zones which affect functionality of the controller input mechanism. Various embodiments are described herein. However, the specific embodiments disclosed herein are merely exemplary, and should not be read as limiting the scope of the invention, but rather as illustrative examples. Those skilled in the art will undoubtedly realize numerous additional embodiments upon study of the present disclosure, and these additional embodiments are recognized as falling within the scope of the present invention.

Figure 18A:
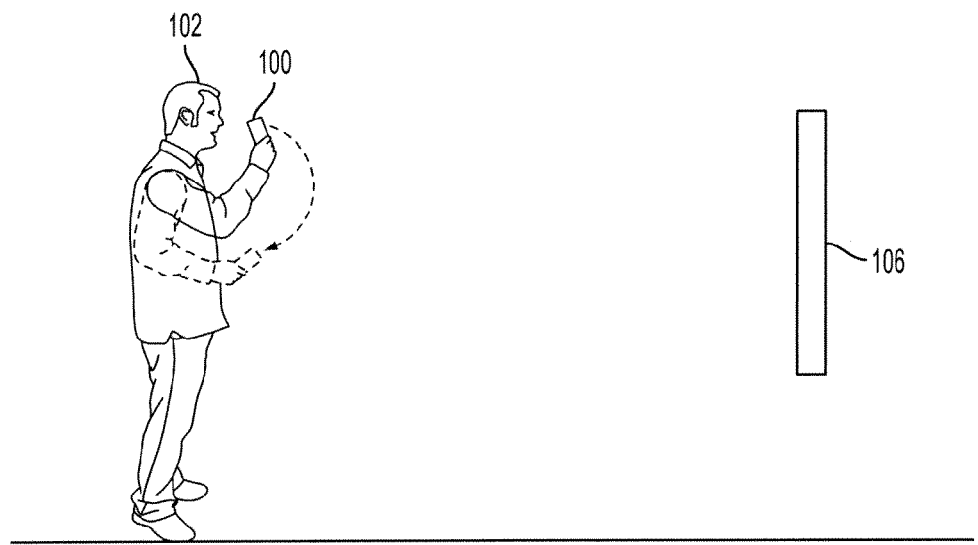
FIGS. 18A and 18B illustrate side views of an interactive environment for providing input to an interactive program, in accordance with an embodiment of the invention.
Figure 18B:
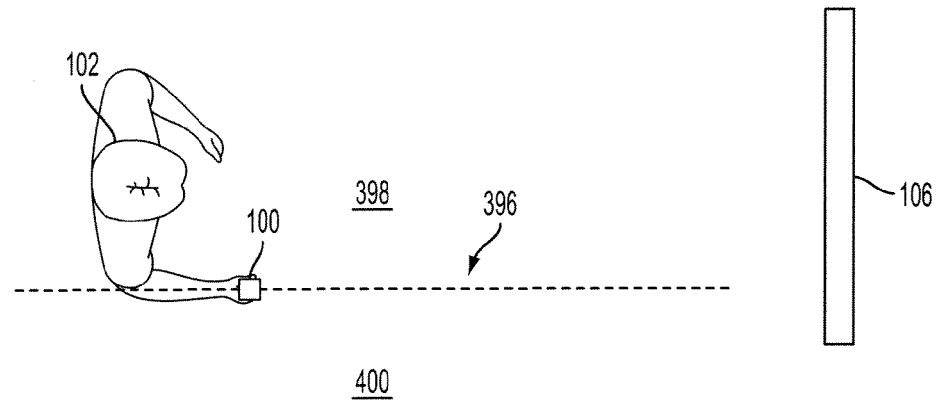

With reference to FIG. 18A, a side view of an interactive environment for providing input to an interactive program is shown, in accordance with an embodiment of the invention. The interactive program is displayed on display 106. A user 102 provides input to the interactive program via a controller 100. In accordance with an embodiment of the invention, the user 102 maneuvers the controller 100 so as to provide input to the interactive program which is utilized to define one or more zones for which the functionality of an input mechanism of the controller 100 is determined when the controller is located in that zone. As shown in the illustrated example, the user 102 maneuvers the controller 100 in a downward arcing motion. By so doing, the path of the controller 100 defines a plane 396, which is illustrated at FIG. 18B. As the position and motion of the controller 100 are tracked, so the interactive program detects the path traced by the downward motion of the controller 100, and utilizes the detected path to determine the plane 396. The plane 396 is then utilized to define a zone 398 and a zone 400 on opposite sides of the plane. The functionality of an action or input mechanism of the controller 100 is determined based on location of the controller with respect to the zones 398 and 400.

Figure 19:
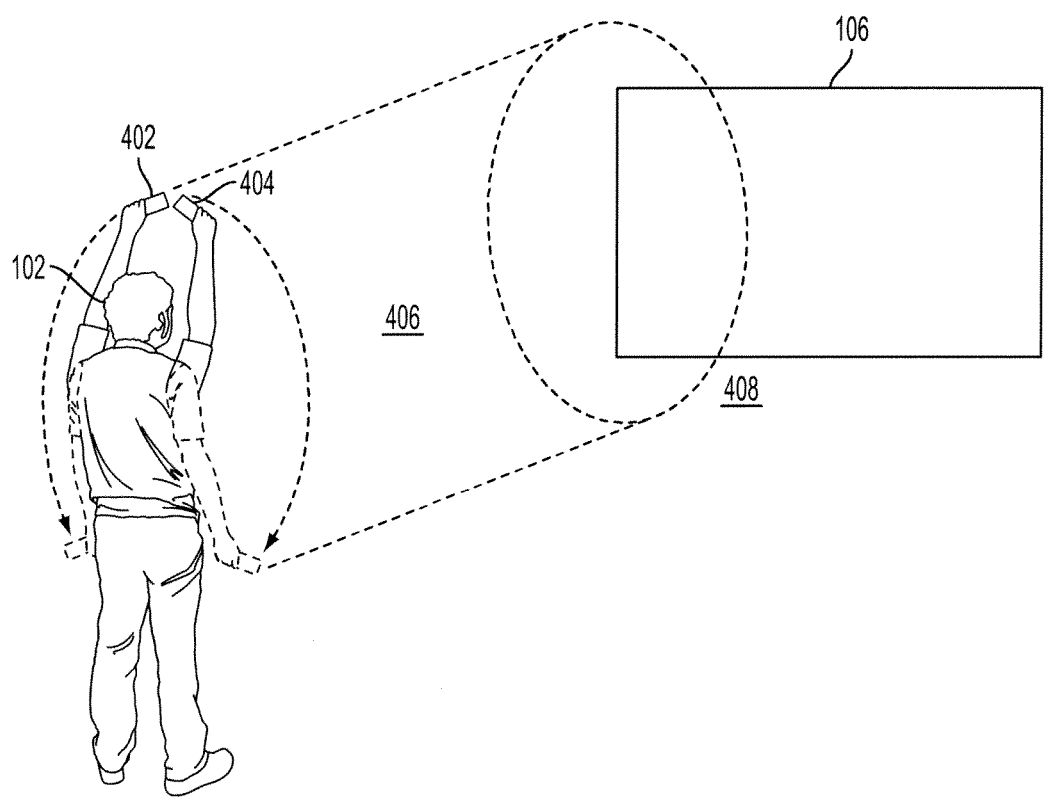
FIG. 19 illustrates a perspective view of an interactive environment for providing input to an interactive program is shown, in accordance with an embodiment of the invention.

With reference to FIG. 19, a perspective view of an interactive environment for providing input to an interactive program is shown, in accordance with an embodiment of the invention. The interactive program is displayed on display 106. A user 102 provides input to the interactive program via a pair of controllers 402 and 404, each of which is handheld. As shown, the user 102 traces an approximately circular path by maneuvering the two controllers 402 and 404. The position and motion of the controllers 402 and 404 is tracked, such that the path traced by the controllers is detected by the interactive program. Then, in one embodiment, the interactive program utilizes the path traced by the controllers to determine an approximately cylindrical zone 406 having an axis oriented towards the display 106, and a zone 408 outside of the cylindrical zone 406. Each of the zones is utilized to determine the functionality of an action or input mechanism of the controllers 402 and 404, based on the location of the controllers with respect to the zones 406 and 408. While the presently described embodiment has been described with reference to a circular shape, in other embodiments of the invention, the user may trace any two-dimensional or three-dimensional shape, including various polygons and the like, such as a triangle, square, cube, sphere, etc.

The foregoing embodiments of user-generated input utilized to determine spatial zones affecting functionality of an action or input mechanism of a controller, are provided by way of example only. In other embodiments, the user may provide any kind of gesture input as allowed by maneuvering the controller. For example, the user may simply hold the controller at a location of the user's choosing, that location then being detected by the interactive program and utilized to determine the location of various zones as previously described. Or the user may trace any kind of line, shape, object, etc. so as to provide input which may be utilized by the interactive program to define the various zones. Those skilled in the art will realize additional embodiments without departing from the scope of the present invention.

Figure 20:
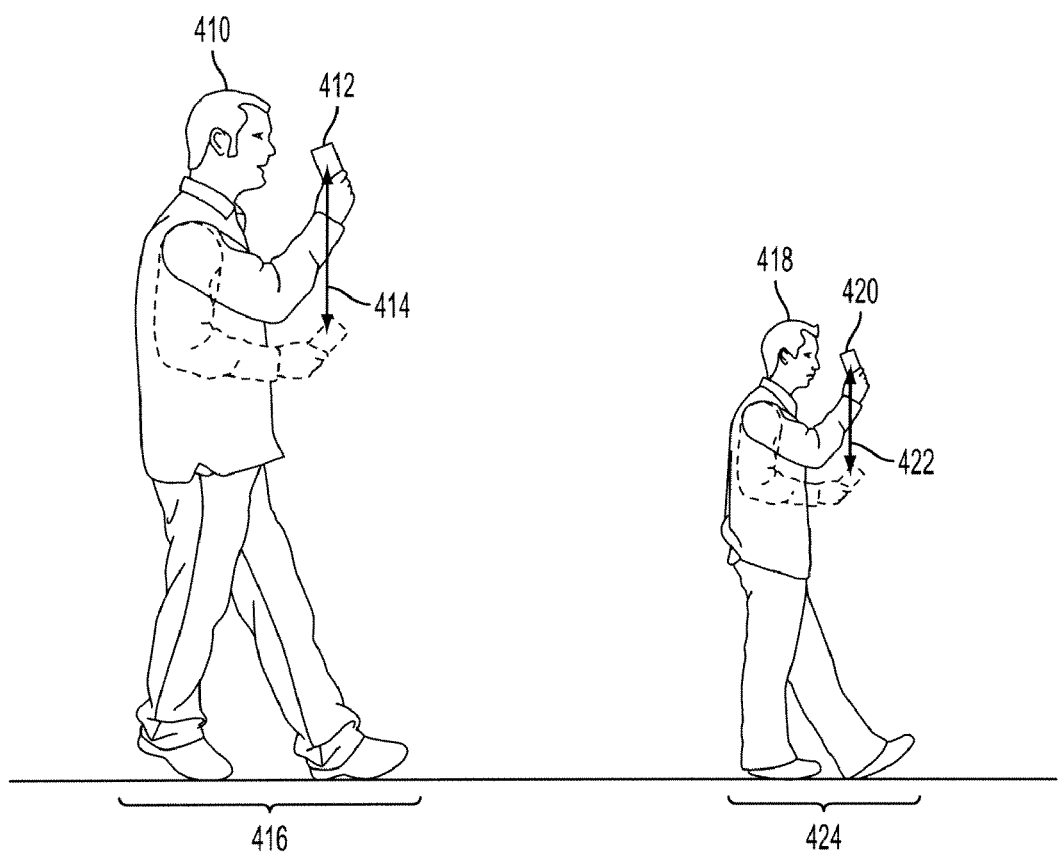
FIG. 20 illustrates two users of different heights in an interactive environment for providing input to an interactive program, in accordance with an embodiment of the invention.

With reference to FIG. 20, two users of different heights are shown in an interactive environment for providing input to an interactive program. A user 410 maneuvers a controller 412 to provide input to the interactive program, whereas a user 418 maneuvers a controller 420. User 410 is taller and larger than user 418. As such, when each of users 410 and 418 hold their respective controllers 412 and 420 in the same relative position, the controller 412 held by user 410 will be higher than the controller 420 held by user 418. Similarly, the same relative motion made by each of the users 410 and 418 will have different sizes, such that the motion made by user 410 is larger than the motion made by user 418. By way of example, user 410 is shown maneuvering the controller 412 in a vertical manner over a distance 414. Likewise, the user 418 is shown maneuvering the controller 420 in the same relative motion across a distance 422. However, because of the difference in size between the users, the distance 414 is greater than the distance 422. In a similar fashion, the distance 416 covered by a step taken by the user 410 is longer than the distance 424 covered by a step taken by the user 418.

As different users may have different biometrics it may be desirable to account for these variances for purposes of providing input to an interactive program. In other words, the interactive program may adjust the effect of position and motion input so that the same relative position and relative motion input provided by different users having different biometrics will nonetheless produce the same result within the interactive program. Therefore, in various embodiments of the invention, a user may provide biometric data such as height, reach, wingspan, and other kinds of biometric data to the interactive program. The interactive program may then utilize the provided biometric data to determine the appropriate adjustments for the effects of position and motion inputs provided by the user. In one embodiment, the biometric data is entered directly by the user. This may be accomplished through a graphical user interface (GUI) or other type of interface.

In another embodiment, the biometric data is determined by having the user perform certain maneuvers, such as positioning or moving a controller in a specified manner. For example, the height of a user may be determined by having the user position the controller at ground level and then hold the controller at the user's height (e.g. at the top of the user's head) and determining the distance between the two positions. Or the user's wingspan may be determined by having the user hold two controllers out at arm's length on opposite sides of the user's body. Similarly, the length of a user's step may be determined by having the user hold a controller in a fixed manner and then having the user take a step, and determining the distance traveled by the controller during the step. The foregoing examples are merely representative of the types of movements and biometric data which may be input by moving the controller. In other embodiments, any of various kinds of movements and actions may be input by using one or more controllers, so as to determine various kinds of biometric data.

Figure 21:
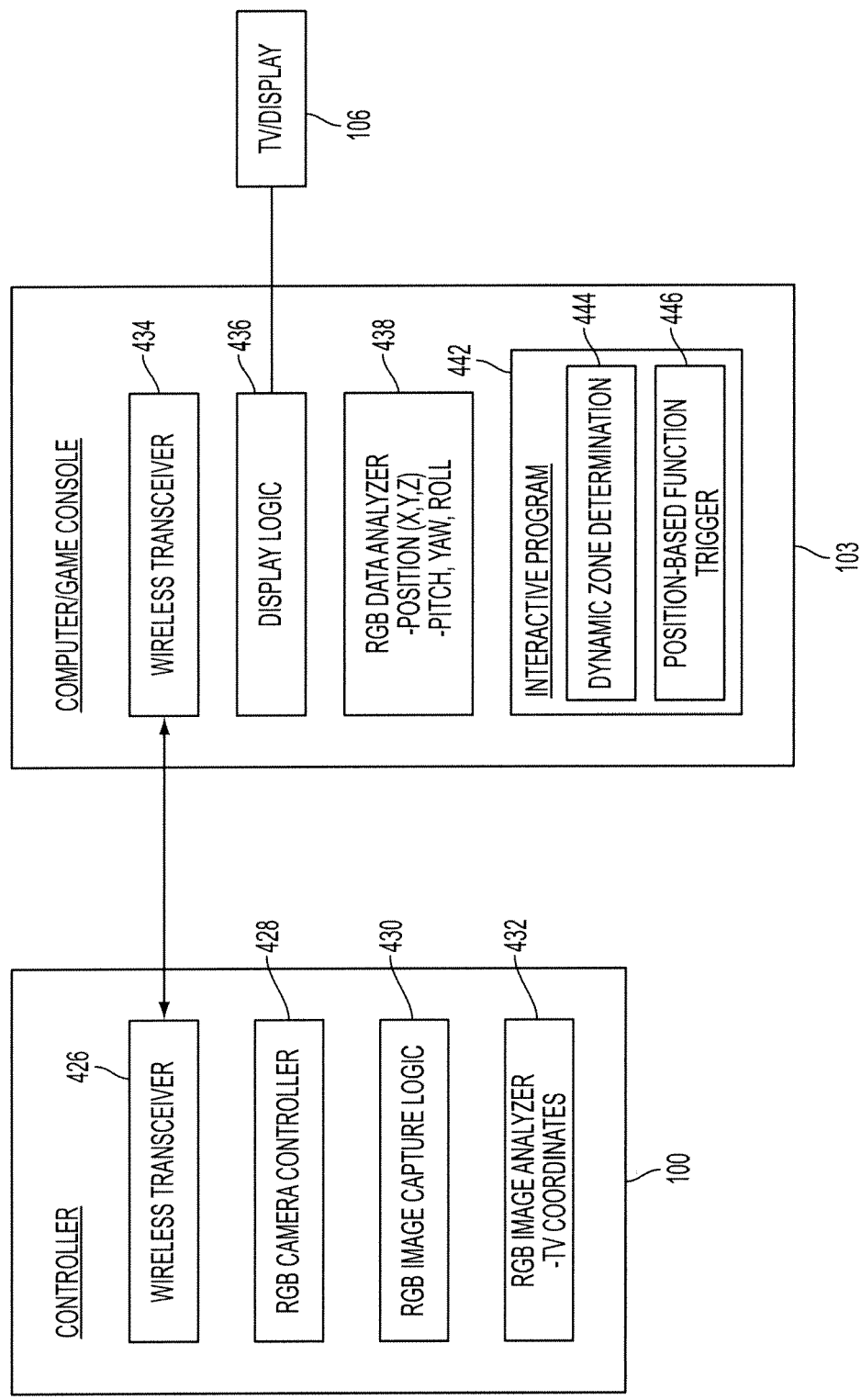
FIG. 21 illustrates a logical diagram of a system for providing controller input to an interactive program, in accordance with an embodiment of the invention.

With reference to FIG. 21, a logical diagram illustrating a system for providing controller input to an interactive program is shown. The computer 103 executes an interactive program 442 which can receive interactive input from the controller 100. The interactive program is displayed to a user via display logic 436, which sends video data to the display 106 for rendering. The controller 100 includes a wireless transceiver 426 for facilitating wireless communications with a computer 103, which also includes a wireless transceiver 434.

The controller 100 additionally includes an RGB camera controller 428 which controls the on/off state of the controller's RGB camera. RGB image capture logic 430 is provided for controlling the RGB image capture of the controller's RGB camera, providing a continuous stream of RGB images at a regular frame rate such as 60 frames per second. In various embodiments, the frame rate of the RGB camera may be greater than or less than 60 frames per second. A higher frame rate yields greater fidelity for purposes of position and orientation determination of the controller 100. An RGB image analyzer 432 performs an initial processing of the captured RGB image frames. In one embodiment, the RGB image analyzer determines the location and shape of the display within the captured RGB images. In one embodiment, this data is reduced to coordinates within the space of the RGB images which describe the outline of the display. These coordinates are sent to the computer 103 for further processing, as the determination of the position/orientation of the controller requires reference to the dimensions of the display 106. In another embodiment, the RGB image analyzer performs a hash or compression of the captured RGB images.

The compressed RGB images are sent to the computer 103 for analysis to determine the location and shape of the display in the images.

The computer 103 includes an RGB data analyzer 438, which analyzes data regarding the captured RGB images from the controller 100. More specifically, the location, shape, size, and orientation of the display within the captured RGB images is determined with reference to the actual dimensions of the display 106. As such, the position and orientation of the controller 100 is determined by the RGB data analyzer 438 based on the perspective distortion and orientation of the display within the captured images, and by reference to the actual dimensions of the display. The position is determined in 3-D space relative to the display 106, and the orientation of the controller 100 is determined in terms of pitch, yaw, and roll.

An interactive program 442 runs on the computer 103. In accordance with an embodiment of the invention, the interactive program 442 includes dynamic zone determination 444, which, based on the operation of the interactive program, determines three dimensional zones which affect the functionality of input mechanisms of the controller 100. Position-based function trigger 446 determines the function to be executed by the interactive program based on received input from the controller, and the controller's position relative to the zones determined by the dynamic zone determination 444.

The above-described system of FIG. 21 constitutes means for providing controller input to an interactive program. The computer 103 constitutes means for executing an interactive program 442 which can receive interactive input from the controller 100. Means for displaying the interactive program to a user are provided by display logic 436, which sends video data to the display 106 for rendering. The controller 100 includes a wireless transceiver 426 which provides means for facilitating wireless communications with the computer 103, which also includes a wireless transceiver 434.

The controller 100 additionally includes an RGB camera controller 428 which constitutes means for controlling the on/off state of the controller's RGB camera. RGB image capture logic 430 constitutes means for controlling the RGB image capture of the controller's RGB camera, providing a continuous stream of RGB images at a regular frame rate such as 60 frames per second. In various embodiments, the frame rate of the RGB camera may be greater than or less than 60 frames per second. An RGB image analyzer 432 constitutes means for performing an initial processing of the captured RGB image frames.

The computer 103 includes an RGB data analyzer 438, which constitutes means for analyzing data regarding the captured RGB images from the controller 100. An interactive program 442 runs on the computer 103. In accordance with an embodiment of the invention, the interactive program 442 includes dynamic zone determination 444, which, based on the operation of the interactive program, provides means for determining three-dimensional zones which affect the functionality of input mechanisms of the controller 100. Position-based function trigger 446 provides means for determining the function to be executed by the interactive program based on received input from the controller, and the controller's position relative to the zones determined by the dynamic zone determination 444.

Figure 22:
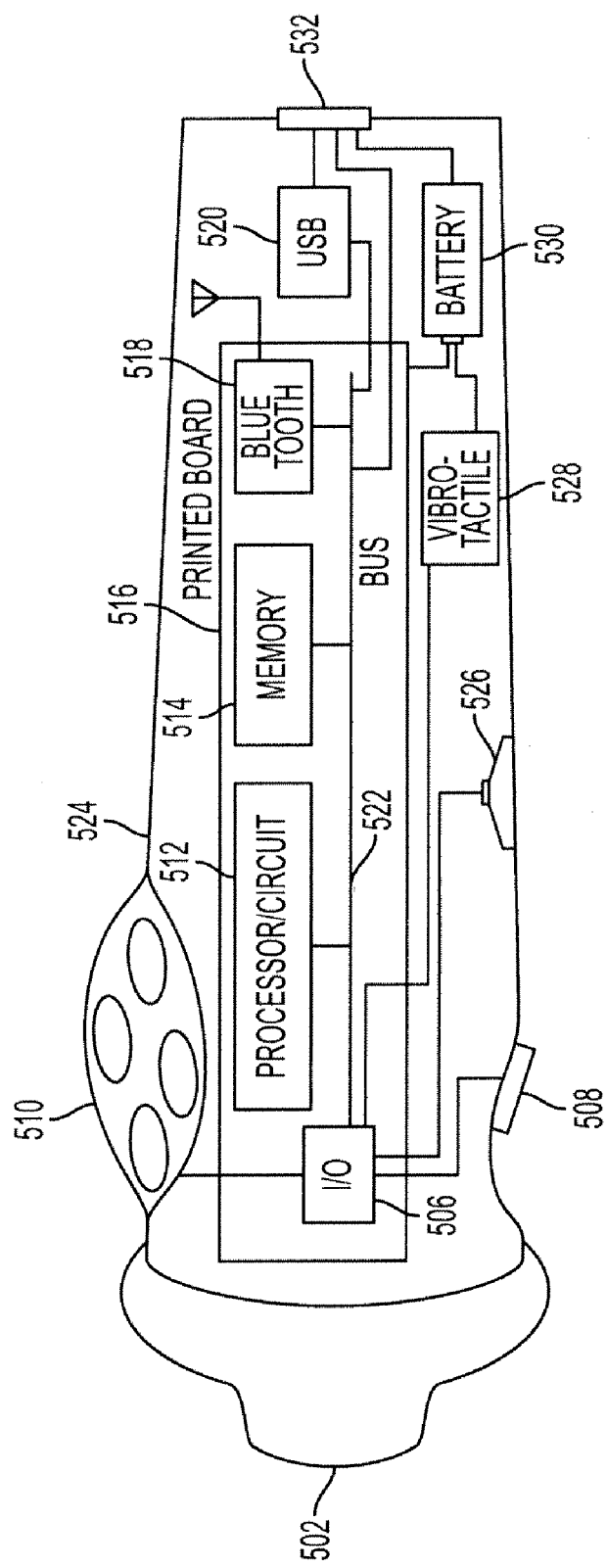
FIG. 22 illustrates the components of a handle of a controller with an expansion connector, in accordance with an embodiment of the invention.

In one embodiment, the controller 100 may consist of a handle and a separate attachment which provides expanded capabilities. FIG. 22 illustrates the components of a handle 524 of a controller with expansion connector 502, in accordance with an embodiment of the invention. Although controllers defined within the spirit and scope of the claims may have more or less components, these exemplary components show example electronics, hardware, firmware, and housing structure to define an operable example. These example components, however, should not limit the claimed inventions, as more or fewer components are possible. Handle 524 is configured to be held by a user operating controller 100 with a single hand. A user's second hand may, of course, be used to hold or select buttons on handle 524. A user holding controller 100 can provide input by pressing buttons, such as top button 510 and bottom button 508. In one embodiment input can also be provided by moving the controller within a three-dimensional space when an attachment is coupled to handle 524, such as the one shown in FIG. 24A. Controller 100 is configured to operate wirelessly, which facilitates freedom of controller movement in order to interact with the computer 103. Wireless communication can be achieved in multiple ways, such as via Bluetooth® wireless link, WiFi, infrared (not shown) link, etc.

Attachments providing expanded capabilities to handle 524 are connected and disconnected to expansion connector 502. In one embodiment, an attachment enables the base computing device to locate the combination of handle and attachment within a three-dimensional space via visual recognition of images taken by a camera within the attachment itself. More specifically, and as explained previously, the location of the combined handle and attachment is determined from images taken at the controller 100 based on perspective distortion and orientation of the display 106 in the captured images. Other embodiments provide additional communication capabilities to controller 100, such as an attachment that provides ultrasonic communication with the computer 103 or with other controllers in the field of play. In yet another embodiment, an attachment provides infrared capabilities to allow the controller to communicate via infrared frequencies with the computer, or to use controller 100 as a remote control for a TV or other electronic equipment.

In one embodiment, the attachment communicates directly with the computer and can act upon commands received from the computer, such as turning on an internal light or emitting a sound. In another embodiment, the attachment is directly controlled by handle 524 and the attachment only reacts to commands from handle 524. In yet another embodiment, the attachment can react to commands received from the computer or from the handle.

Inside handle 524, printed circuit board 516 holds processor 512, Input/Output (I/O) module 506, memory 516, and Bluetooth module 518, all interconnected by bus 522. A Universal Serial Bus (USB) module 520 also provides interactivity with the base computing device, or with other devices connected to USB port 532. The USB port can also be used to charge the rechargeable battery 530. Vibrotactile feedback is provided by vibrotactile module 528. Speaker 526 provides audio output.

Note that the above controller configuration is exemplary and many modifications thereto, including eliminating or adding modules, would occur to a person of ordinary skill in the art with access to the present Specification, and is well within the scope of the claimed invention. For example, controller 100 can also include sensors for mechanical tracking of the controller movement.

Figure 23:
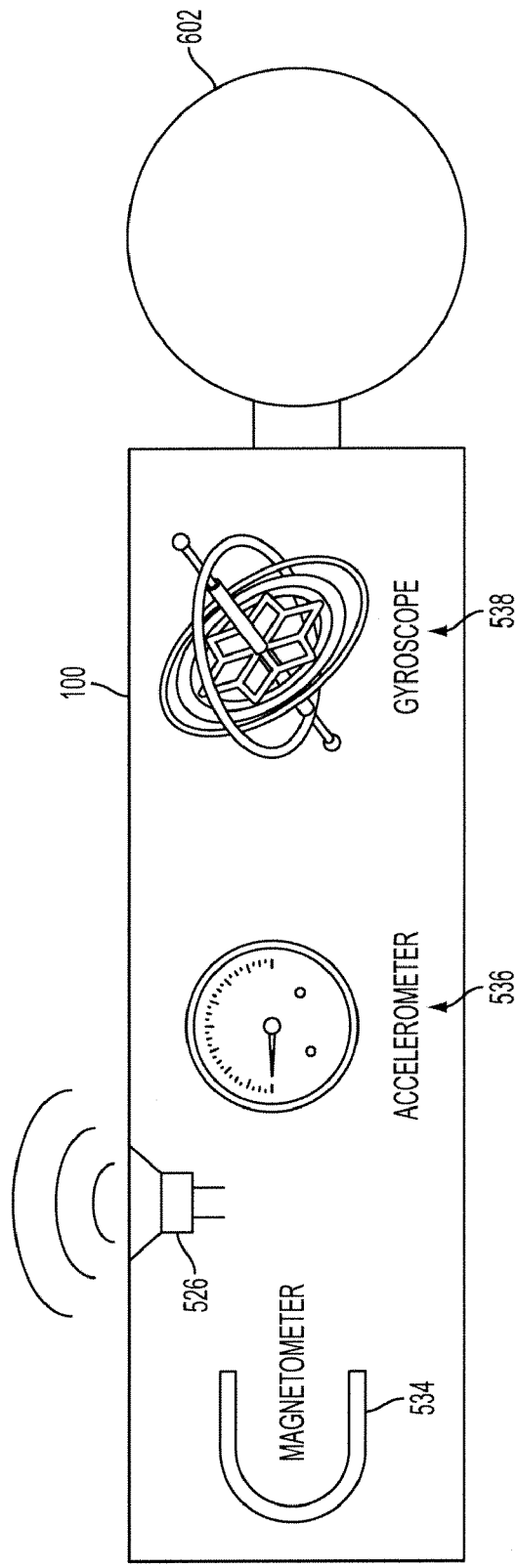
FIG. 23 illustrates a controller having sensors for improving movement tracking, in accordance with an embodiment of the invention.

FIG. 23 depicts a controller 100 with sensors for improving movement tracking, according to one embodiment. Different embodiments include different combinations of sensors, such as magnetometers 534, accelerometers 536, gyroscopes 538, etc. An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 536 are used to provide the direction of gravity, which gives an absolute reference for 2 angles (world-space pitch and world-space roll). Controllers can suffer accelerations exceeding 5 g, therefore accelerometers able to operate with forces exceeding 5 g are used inside controller 100.

A magnetometer measures the strength and direction of the magnetic field in the vicinity of the controller. In one embodiment, three magnetometers 534 are used within the controller, ensuring an absolute reference for the world-space yaw angle. The magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from the gyros (see below) or the camera. In one embodiment, accelerometer 536 is used together with magnetometer 534 to obtain the inclination and azimuth of the controller.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes can drift overtime without the existence of an absolute reference. This requires, resetting the gyroscopes periodically, which can be done using other available information, such as positional/orientation determination based on visual tracking of the display 106, accelerometer, magnetometer, etc. A hand-held device can rotate faster than 500 degrees/sec, so a gyroscope with a spec of more than 1000 degrees/sec is recommended, but smaller values are also possible.

The information from the different sources can be combined for improved location and orientation detection. For example, if the controller is moved or oriented such that the display is no longer in the field of view of the RGB camera, then the accelerometer's orientation sensing is used to detect that the controller is facing away from the display. In one embodiment, controller 100 includes speaker 526 to provide audio feedback to the player. The controller can produce a beep when the display is not in the RGB camera's field of view, prompting the player to orientate the controller in the right direction or to come back into the field of play.

Figure 24A:
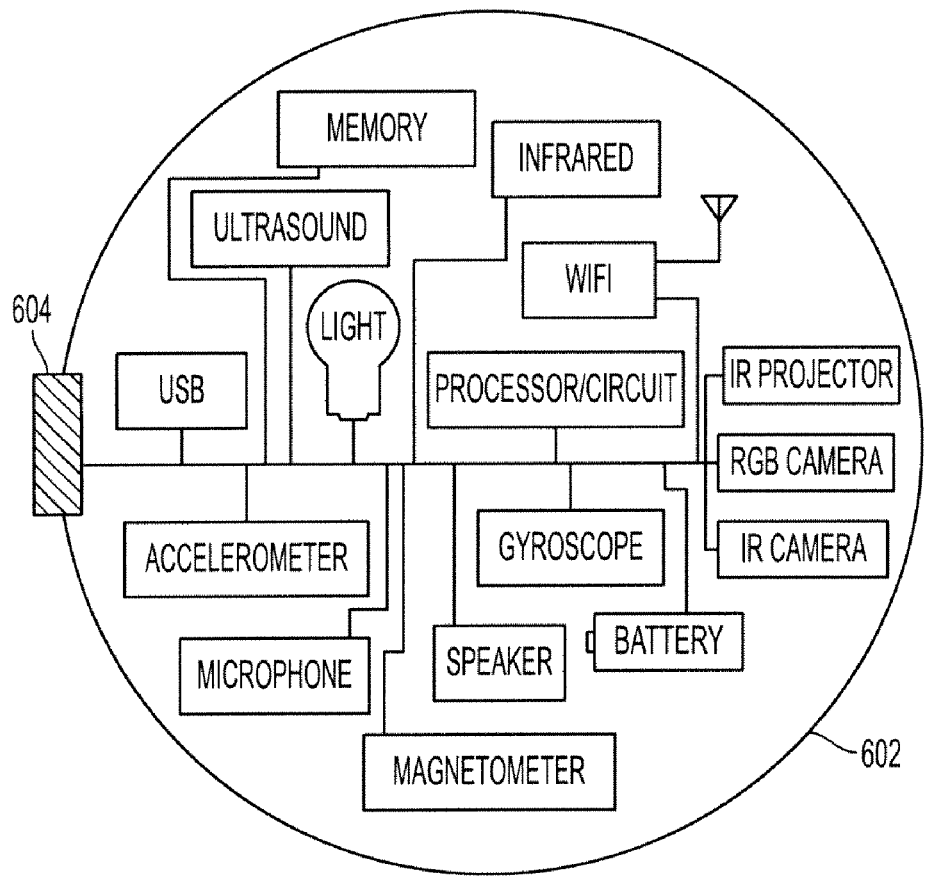
FIG. 24A illustrates an attachment for coupling to a handle of a controller, in accordance with an embodiment of the invention.

FIG. 24A depicts an attachment 602 for the handle 524 with a "rich" feature set. It should be appreciated that the embodiment illustrated in FIG. 23A is exemplary and other embodiments may include a subset of the features of attachment 602. The embodiment illustrated in FIG. 23A should therefore not be interpreted to be exclusive or limiting, but rather exemplary or illustrative.

The different modules in spherical attachment 602 are interconnected via a common bus, but other interconnection mechanisms are possible. Connector 604 provides the interface to connect or disconnect attachment 602 from the controller. Attachment 602 includes a processor or circuit plus memory allowing the attachment to process computer instructions. Further, attachment 602 includes communication modules such as ultrasound, infrared, and WiFi. Such communications enable the attachment to communicate with the computer or other electronic devices, which is referred to herein as a communications interface between the controller and the computer or any other electronic device. In one embodiment, the attachment operates as a modem by receiving information from the controller and forwarding the information to the computer, and vice versa.

Information received by the attachment and passed to the controller is used to change the state of the controller. For example, the controller may emit a sound, change button configuration, disable the controller, load registers in memory, send a command to the attachment to light up, etc. The information received by the computer is used by the interactive program to update the state of the interactive program. For example, the interactive program may move an avatar on the screen or change the status of the avatar, fire a weapon, start a game, select an option in a menu, etc.

An accelerometer, a magnetometer and a gyroscope provide mechanical information related to the movement of the attachment. In one embodiment, the mechanical or inertial information is combined with other location determination information, such as visual tracking of the display, in order to refine the determination of the location of the controller-attachment combo.

An internal light emitting device allows the attachment to be lit from the inside to provide user feedback. In one embodiment, light emitting device can emit light of a single color, and in another embodiment, light emitting device can be configured to emit light from a choice of colors. In yet another embodiment, attachment 602 includes several light emitting devices, each device being capable of emitting light of one color. The light emitting device is configurable to emit different levels of brightness. The computer can provide interactivity to the user holding the controller by changing the light emitting status of attachment 602, producing audio signals, or with vibrotactile feedback, etc. One feedback operation or a combination of feedback operations is possible. In one embodiment, the type of feedback is selected from a list of predefined interactivity, and based on what is occurring in a game.

A microphone and a speaker provide audio capabilities, while a battery powers the rest of the components, including the processor and the light emitting device. The battery can also be used by the handle as a second source of power. For example, if the rechargeable battery in the controller is discharged, the attachment can provide the required power so the user can continue playing instead of having to stop to recharge the controller. In one embodiment, attachment 602 does not include the battery and power to the modules in attachment 602 is obtained via an electrical connection with the power source of the handle.

An IR projector and an IR camera provide IR functionality for determining relative position and orientation of the controller. An RGB camera captures RGB images of the display so that the position of the controller may be determined based on the perspective distortion and orientation of the display in the captured RGB images.

A USB module allows USB communication to and from the attachment. In one embodiment, the USB connection is used to charge the battery in the attachment. In yet another embodiment, attachment 602 includes files in memory that are transferred to the controller, or to the computer, or to both the controller and the computer. The files in memory can include configuration files or programs that are transferred for execution in the controller or the gaming system. The files can be used to identify a specific user, to configure the controller or the base system, to load a game, to add features to existing games, etc. For example, one file is a game that is loaded to the computer for playing, another file contains karaoke songs that can be used in a sing-along game, another file contains new player rosters and statistics for an update to a sports game, etc. In addition, the attachment can be used to store user parameters, such as player configuration for a particular game. The player can then use the attachment in a different gaming system to play with other players using the configuration obtained from the original gaming system.

Figure 24B:
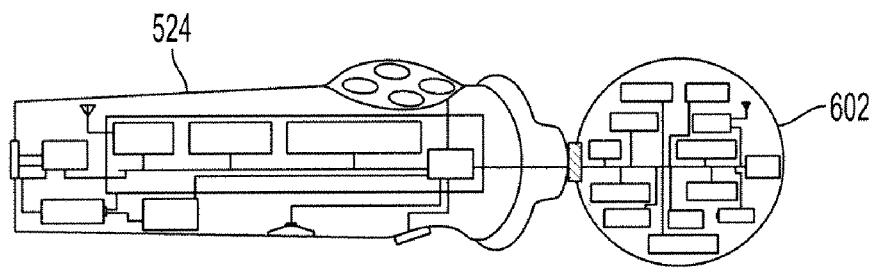

FIG. 24B illustrates an embodiment where the attachment of FIG. 24A is connected to the controller of FIG. 22. In one embodiment, attachment 602 interacts with controller 524 via a communications interface, such as a USB interface. In another embodiment, attachment 602 is in electrical communication with one or several internal modules inside controller 524. For example, processor/circuit of attachment 602 (as seen in FIG. 24A) is connected to bus 522 of controller 524 (as seen in FIG. 22), thus allowing the processor of attachment 602 to communicate with the modules in the controller attached to the bus. The processor of attachment 602 can access memory 516 to write or read data directly, or generate interrupts for processor/circuit 512 of controller 524 to signal an external event which must be processed by processor 512.

It should be noted that the embodiment depicted in FIG. 24B is exemplary and other embodiments may include fewer components.

Figure 25:
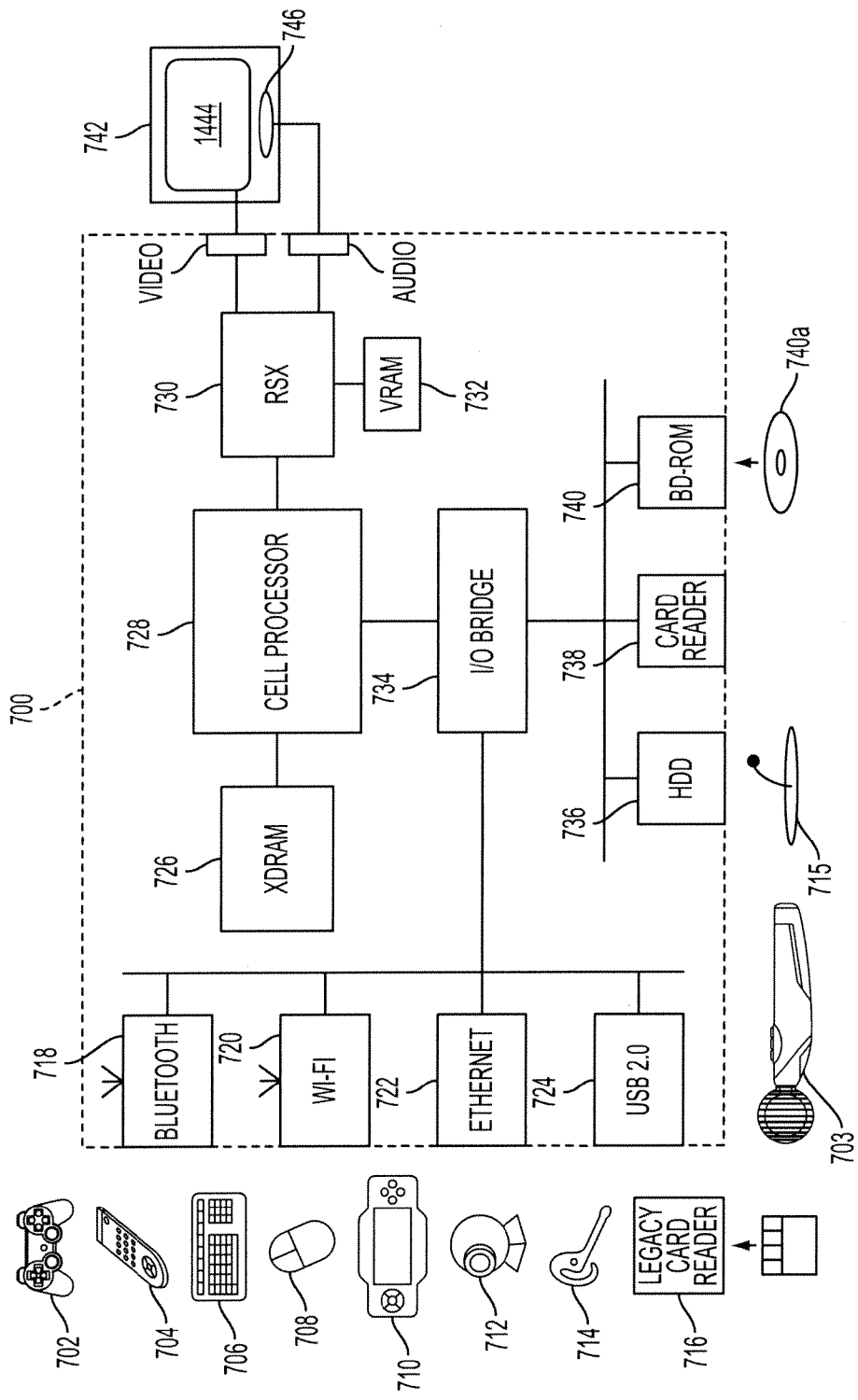
FIG. 25 illustrates hardware and user interfaces that may be used to determine controller location, in accordance with one embodiment of the present invention.

FIG. 25 illustrates hardware and user interfaces that may be used to determine controller location, in accordance with one embodiment of the present invention. FIG. 25 schematically illustrates the overall system architecture of the Sony® Playstation 3® entertainment device, a console that may be compatible for interfacing a control device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Figure 26:
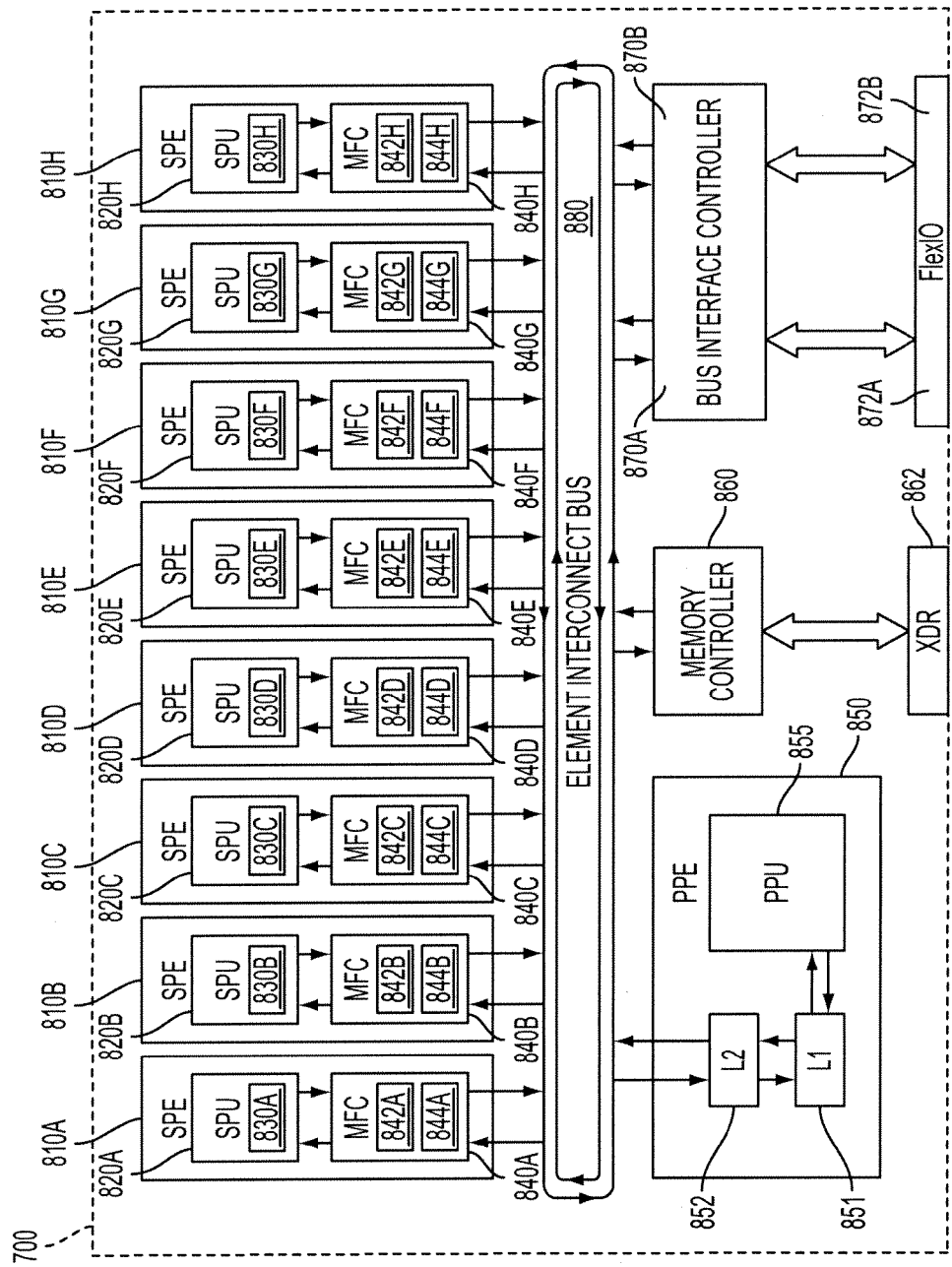
FIG. 26 illustrates additional hardware that may be used to process instructions, in accordance with one embodiment of the present invention.

FIG. 26 illustrates additional hardware that may be used to process instructions, in accordance with one embodiment of the present invention. Cell processor 728 has an architecture comprising four basic components: external input and output structures comprising a memory controller 860 and a dual bus interface controller 870A, B; a main processor referred to as the Power Processing Element 850; eight co-processors referred to as Synergistic Processing Elements (SPEs) 810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 850 is based upon a two-way simultaneous multithreading Power 570 compliant PowerPC core (PPU) 855 running with an internal clock of 3.2 GHz. It comprises a 512 kB level 2 (L2) cache and a 32 kB level 1 (L1) cache. The PPE 850 is capable of eight single position operations per clock cycle, translating to 25.6 GFLOPs at 3.2 GHz. The primary role of the PPE 850 is to act as a controller for the Synergistic Processing Elements 810A-H, which handle most of the computational workload. In operation the PPE 850 maintains a job queue, scheduling jobs for the Synergistic Processing Elements 810A-H and monitoring their progress. Consequently each Synergistic Processing Element 810A-H runs a kernel whose role is to fetch a job, execute it and synchronized with the PPE 850.

Each Synergistic Processing Element (SPE) 810A-H comprises a respective Synergistic Processing Unit (SPU) 820A-H, and a respective Memory Flow Controller (MFC) 840A-H comprising in turn a respective Dynamic Memory Access Controller (DMAC) 842A-H, a respective Memory Management Unit (MMU) 844A-H and a bus interface (not shown). Each SPU 820A-H is a RISC processor clocked at 3.2 GHz and comprising 256 kB local RAM 830A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 820A-H does not directly access the system memory XDRAM 726; the 64-bit addresses formed by the SPU 820A-H are passed to the MFC 840A-H which instructs its DMA controller 842A-H to access memory via the Element Interconnect Bus 880 and the memory controller 860.

The Element Interconnect Bus (EIB) 880 is a logically circular communication bus internal to the Cell processor 728 which connects the above processor elements, namely the PPE 850, the memory controller 860, the dual bus interface 870A,B and the 8 SPEs 810A-H, totaling 12 participants. Participants can simultaneously read and write to the bus at a rate of 8 bytes per clock cycle. As noted previously, each SPE 810A-H comprises a DMAC 842A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 860 comprises an XDRAM interface 862, developed by Rambus Incorporated. The memory controller interfaces with the Rambus XDRAM 726 with a theoretical peak bandwidth of 25.6 GB/s.

The dual bus interface 870A,B comprises a Rambus FlexIO® system interface 872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 734 via controller 870A and the Reality Simulator graphics unit 730 via controller 870B.

Data sent by the Cell processor 728 to the Reality Simulator graphics unit 730 will typically comprise display lists, being a sequence of commands to draw vertices, apply textures to polygons, specify lighting conditions, and so on.

Figure 27:
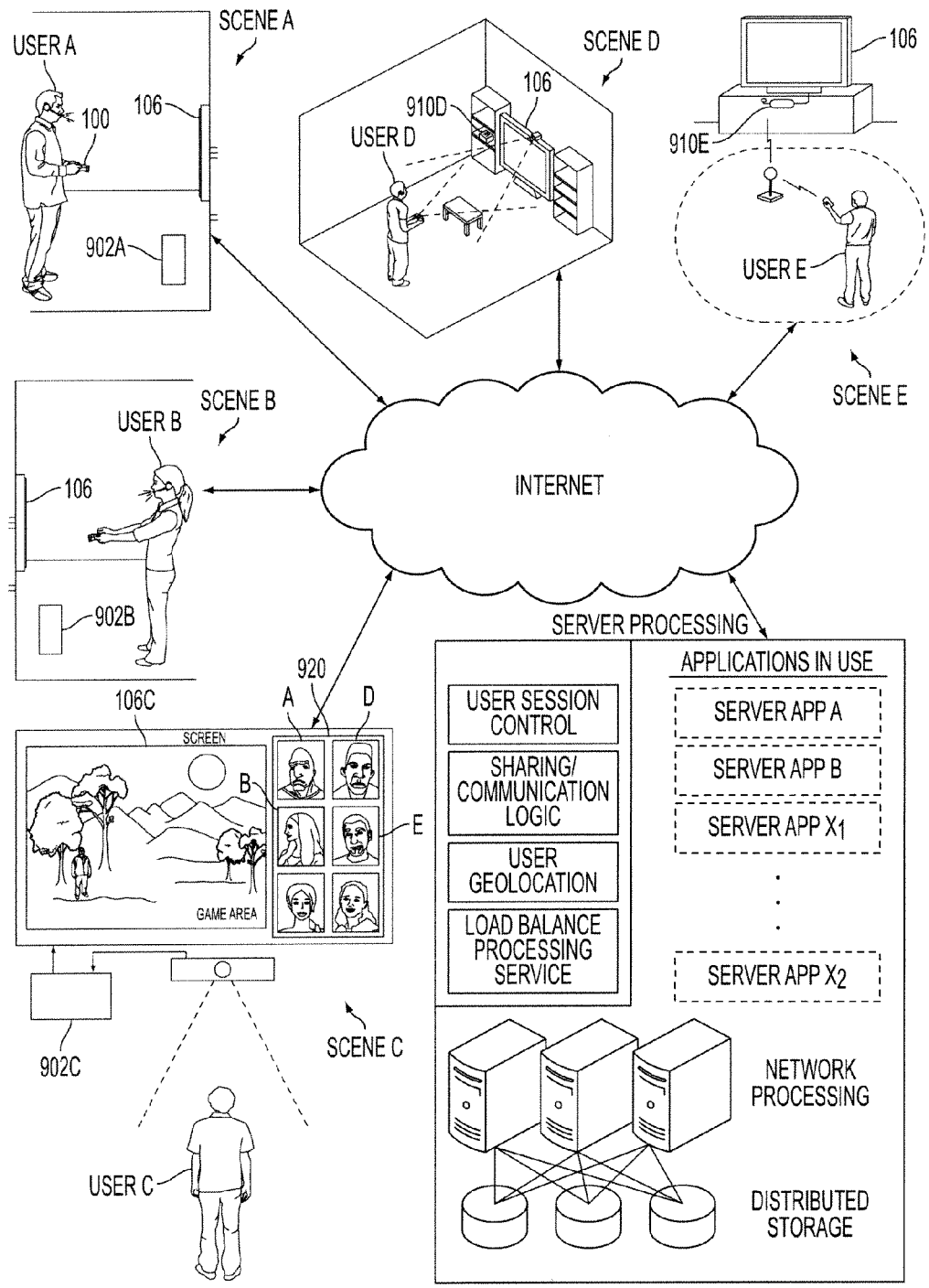
FIG. 27 is an exemplary illustration of multiple users interacting with game clients that are connected to server processing via the internet, in accordance with an embodiment of the present invention.

FIG. 27 is an exemplary illustration of scene A through scene E with respective user A through user E interacting with game clients 902 that are connected to server processing via the internet, in accordance with an embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 27, user A interacts with a client application displayed on a monitor 106 using a controller 100 paired with game client 902A. Similarly, within scene B, user B interacts with another client application that is displayed on monitor 106 using a controller 100 paired with game client 902B. Scene C illustrates a view from behind user C as he looks at a monitor displaying a game and buddy list from the game client 902C. While FIG. 27 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 902 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

As shown in FIG. 27, the server processing module has instances of server application A and server application B. The server processing module is able to support multiple server applications as indicated by server application X1 and server application X2. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 902C allows user C to create and view a buddy list 720 that includes user A, user B, user D and user E. As shown, in scene C, user C is able to see either real time images or avatars of the respective user on monitor 106C. Server processing executes the respective applications of game client 902C and with the respective game clients 902 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 910D and 910E respectively. Each game console 910D and 910E are connected to the server processing module and illustrate a network where the server processing modules coordinates game play for both game consoles and game clients.

Figure 28:
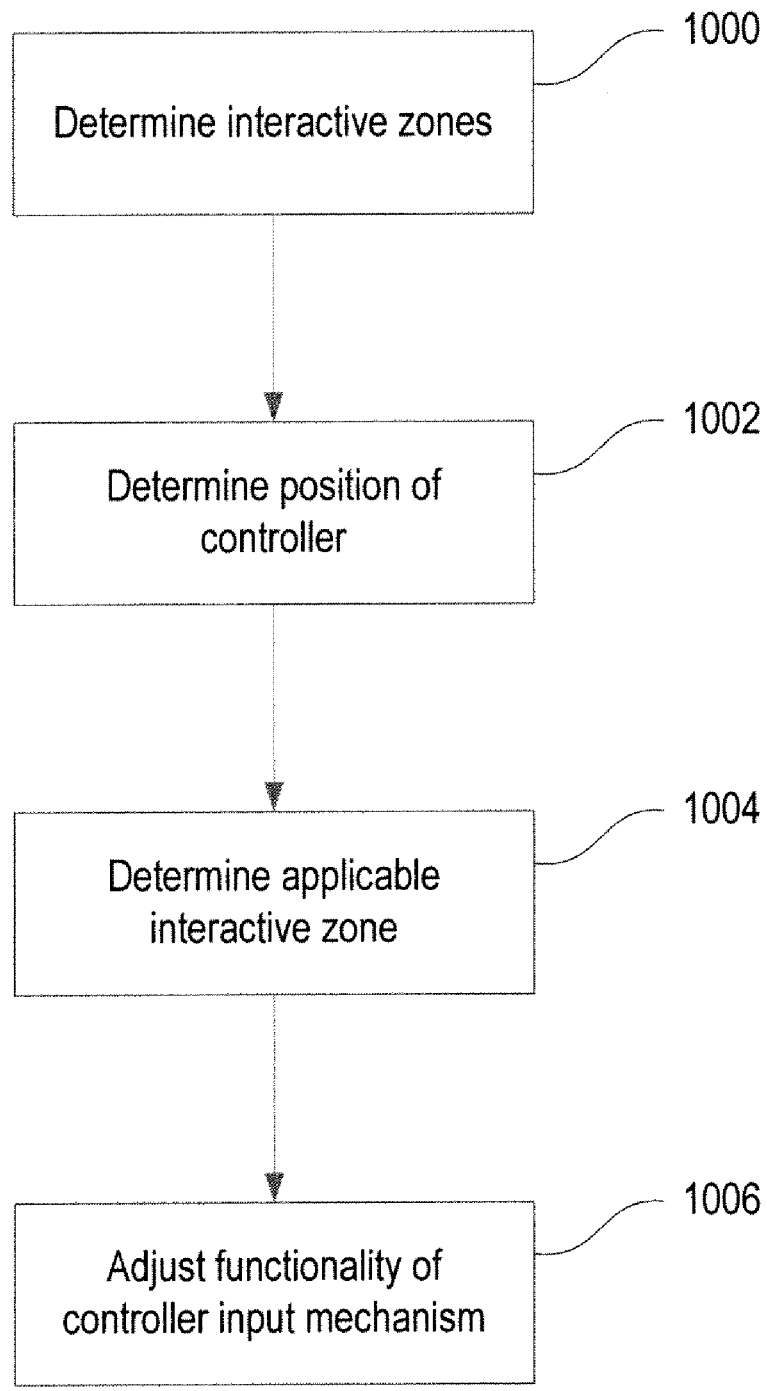
FIG. 28 illustrates a method for adjusting the functionality of an input mechanism of a controller, in accordance with an embodiment of the invention.

With reference to FIG. 28, a method of adjusting the functionality of an input mechanism of a controller based on its position is described, in accordance with an embodiment of the invention. At method operation 1000, interactive zones are determined The interactive zones are spatial regions for which the functionality of an input mechanism of a controller is determined. Thus, as the controller is moved from one spatial zone to another, so the functionality of the input mechanism will change. At method operation 1002, the position of the controller is determined In one embodiment, the position of the controller is determined based on perspective distortion and orientation of a display in captured images of the display taken by the controller. At method operation 1004, the applicable interactive zone is determined by determining which interactive zone, if any, the controller is located within. At method operation 1006, based on the applicable interactive zone, the functionality of the controller input mechanism is adjusted. If the controller has not changed interactive zones, then functionality of the controller input mechanism does not change. However, if the controller is found to be in a different interactive zone, then the functionality is changed accordingly.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining a functionality of an action of a controller device, the controller device configured for interfacing with an interactive program, the method comprising:
defining interactive zones, each interactive zone being defined by a spatial region having an associated specified function for the action of the controller device when the controller device is located within that interactive zone;
determining a position of the controller device; and
setting the functionality of the action of the controller device to have the specified function associated with the interactive zone within which the controller device is located.

2. The method of claim 1, wherein each spatial region defines a volume located on a front side of a display, the front side of the display being a side on which an image projected by the display may be viewed.

3. The method of claim 2, wherein a total volume defined by the interactive zones defines an interactive region within which the position of the controller device may be determined.

4. The method of claim 1, wherein each specified function is operable for causing an action within the interactive program.

5. The method of claim 4, wherein the specified functions associated with two or more of the interactive zones are similar functions which vary by degree.

6. The method of claim 4, wherein the specified functions associated with two or more of the interactive zones are dissimilar functions.

7. The method of claim 1, wherein the action of the controller device is an input received from a user of the controller device and communicated from the controller device to the interactive program.

8. The method of claim 7, wherein the input received from a user is entered via an input device of the controller device.

9. The method of claim 8, wherein the input device is selected from a group consisting of a button, joystick, trigger, touchpad, trackball, or pressure sensor.

10. The method of claim 7, wherein the input received from a user is entered via movement of the controller device.

11. The method of claim 1, wherein the determination of the position of the controller device includes,
capturing an image of a display at the controller device; and
determining the position of the controller device based on perspective distortion of the display in the captured image of the display.

12. A method for interfacing with an interactive program, the method comprising:
defining a plurality of zones, the plurality of zones being defined within an interactive region of space for which a location of a controller device may be determined;
continuously detecting the location of one or more controller devices;
when a controller device is determined to be positioned within one of the plurality of zones, setting an action of the controller device that is communicated to the interactive program to have a function associated with that zone, the function being defined for causing an action within the interactive program.

13. The method of claim 12, wherein the plurality of zones are arranged in a non-overlapping and contiguous fashion so as to define a spatial matrix within the interactive region of space.

14. The method of claim 12, wherein a different subset of the plurality of zones is operative for determining the function of an action of each of the controller devices.

15. The method of claim 12, wherein each of the plurality of the zones has one or more associated functions which correspond to one or more of the controller devices.

16. The method of claim 12, further comprising,
activating a zone indicator when the controller device is determined to be positioned within one of the plurality of zones, the zone indicator providing a notification of which of the plurality of zones in which the controller devices is located.

17. The method of claim 16, wherein the zone indicator is selected from the group consisting of a light indicator, a sound, a visual indicator on a display, and vibration of the controller device.

18. The method of claim 12, wherein detection of a transition of the controller device from a location within a zone to a location outside of the zone causes a signaling response to be activated.

19. The method of claim 18, wherein the signaling response is selected from the group consisting of a sound, a light indicator, a warning on a display, and vibration of the controller device.

20. The method of claim 12, wherein functions associated with one or more of the zones are different types of sounds.

21. The method of claim 12, wherein the action communicated to the interactive program is a movement of the controller device, the movement of the controller device being defined by a change in location and/or orientation.

22. The method of claim 12, wherein the continuous detection of the location of the one or more controller devices includes,
    capturing an image of a display at each controller device; and
    continuously determining the location of each controller device based on perspective distortion of the display in the captured image of the display.

23. A system for interfacing with an interactive program, the system configured for rendering the interactive program on a display, the system comprising:
    a computing device for executing the interactive program;
    a controller device for providing input to the interactive program, the controller device having an image capture device for capturing images of the display, the position of the controller device being continuously determined based on a perspective distortion of the display in the captured images of the display;
    wherein the computing device is configured to define interactive zones, each interactive zone being defined by a spatial region having an associated specified function for an action of the controller device when the controller device is located within that interactive zone; and
    wherein the computing device is configured to set the functionality of the action of the controller device to the specified function associated with the interactive zone within which the controller device is located.

24. The system of claim 23, wherein each spatial region defines a volume located on a front side of the display, the front side of the display being a side on which an image projected by the display may be viewed.

25. The system of claim 23, wherein each specified function is operable for causing an action within the interactive program.

26. The system of claim 23, wherein the interactive zones are dynamically determined according to a state of the interactive program.

27. A controller device for providing input to an interactive program, the interactive program being executed by a computing device and rendered on a display, the controller device comprising:
    an image capture device for capturing images of a display;
    a position determination module for continuously determining the position of the controller device based on a perspective distortion of the display in the captured images of the display;
    a functionality setting module for setting the functionality of an action of the controller device;
    wherein the controller device is configured to be operated within interactive zones, each interactive zone being defined by a spatial region having an associated specified function for the action of the controller device when the controller device is located within that interactive zone; and
    wherein the functionality setting module is configured to set the functionality of the action of the controller device to the specified function associated with the interactive zone within which the controller device is located.

* * * * *